US012488775B2

(12) United States Patent
Han et al.

(10) Patent No.: US 12,488,775 B2
(45) Date of Patent: Dec. 2, 2025

(54) ECHO FILTERING METHOD, ELECTRONIC DEVICE, AND COMPUTER-READABLE STORAGE MEDIUM

(71) Applicant: HUAWEI TECHNOLOGIES CO., LTD., Guangdong (CN)

(72) Inventors: Bo Han, Shenzhen (CN); Ling Tang, Shenzhen (CN); Fan Fan, Shenzhen (CN); Daihu Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 18/157,158

(22) Filed: Jan. 20, 2023

(65) Prior Publication Data
US 2023/0162718 A1 May 25, 2023

Related U.S. Application Data

(63) Continuation of application No. PCT/CN2021/103350, filed on Jun. 30, 2021.

(30) Foreign Application Priority Data

Jul. 21, 2020 (CN) .................. 202010707669.X

(51) Int. Cl.
G10K 11/178 (2006.01)
G06F 3/16 (2006.01)
(Continued)

(52) U.S. Cl.
CPC ........ *G10K 11/17823* (2018.01); *G06F 3/165* (2013.01); *G10K 11/17825* (2018.01);
(Continued)

(58) Field of Classification Search
CPC ....... G10K 11/17823; G10K 11/17825; G10K 11/17881; G10K 2210/30231;
(Continued)

(56) References Cited

U.S. PATENT DOCUMENTS 9,215,327 B2 12/2015 Bathurst et al.
9,508,359 B2 * 11/2016 Gao ...................... H04M 9/082
(Continued)

FOREIGN PATENT DOCUMENTS

CN 1659927 A 8/2005
CN 101040512 A 9/2007
(Continued)

OTHER PUBLICATIONS

Herbert Buchner et al:"Generalized multichannel frequency-domain adaptive filtering: efficient realization and application to hands-free speech communication". doi: 10.1016/j.sigpro.2004.07.029, Sep. 15, 2003, total 22 pages.
(Continued)

*Primary Examiner* — David L Ton

(57) ABSTRACT

An echo filtering method, an electronic device, a computer-readable storage medium, and an echo filtering apparatus are disclosed. The electronic device includes M microphones and N speakers. M and N are integers greater than 1. The method includes: obtaining N speaker signals corresponding to the N speakers; obtaining M microphone signals corresponding to the M microphones; and performing at least direct sound filtering on the N speaker signals and the M microphone signals to obtain a target signal. By using this method, better echo filtering effect can be obtained.

19 Claims, 13 Drawing Sheets

(51) Int. Cl.
 *G10L 21/0232* (2013.01)
 *G10L 21/0208* (2013.01)
 *G10L 21/0216* (2013.01)

(52) U.S. Cl.
 CPC .... *G10K 11/17881* (2018.01); *G10L 21/0232* (2013.01); *G10K 2210/30231* (2013.01); *G10K 2210/3026* (2013.01); *G10K 2210/3027* (2013.01); *G10K 2210/3028* (2013.01); *G10K 2210/3035* (2013.01); *G10K 2210/3044* (2013.01); *G10K 2210/3046* (2013.01); *G10K 2210/3056* (2013.01); *G10K 2210/505* (2013.01); *G10L 2021/02082* (2013.01); *G10L 2021/02166* (2013.01)

(58) Field of Classification Search
 CPC ... G10K 2210/3026; G10K 2210/3027; G10K 2210/3028; G10K 2210/3035; G10K 2210/3044; G10K 2210/3046; G10K 2210/3056; G10K 2210/505; G10L 21/0232; G10L 2021/02082; G06F 3/165
 See application file for complete search history.

(56) References Cited

U.S. PATENT DOCUMENTS

| | | | | |
|---|---|---|---|---|
| 9,997,151 | B1 * | 6/2018 | Ayrapetian | G10K 11/178 |
| 10,013,995 | B1 | 7/2018 | Lashkari et al. | |
| 11,741,934 | B1 * | 8/2023 | Zhang | G10L 21/0208 381/71.11 |
| 2009/0316923 | A1 * | 12/2009 | Tashev | H04R 3/005 381/71.1 |
| 2014/0003635 | A1 * | 1/2014 | Mohammad | H04R 3/005 381/306 |
| 2021/0098015 | A1 * | 4/2021 | Pandey | H04R 1/406 |
| 2022/0335937 | A1 * | 10/2022 | Thomas | G10L 15/22 |

FOREIGN PATENT DOCUMENTS

| | | |
|---|---|---|
| CN | 106448691 A | 2/2017 |
| CN | 110660404 A | 1/2020 |
| CN | 111107461 A | 5/2020 |
| CN | 111201712 A | 5/2020 |
| KR | 20140034817 A | 3/2014 |
| KR | 20190118528 A | 10/2019 |
| KR | 20200049521 A | 5/2020 |

OTHER PUBLICATIONS

PCT International Search Report for Application No. PCT/CN2021/103350 dated Jun. 30, 2021, 10 pages.

Chinese Office Action for Application No. 202010707699.X dated Dec. 8, 2024, 12 pages.

* cited by examiner

ECHO FILTERING METHOD, ELECTRONIC DEVICE, AND COMPUTER-READABLE STORAGE MEDIUM

CROSS-REFERENCE TO RELATED APPLICATIONS

This application is a continuation of International Application No. PCT/CN2021/103350, filed on Jun. 30, 2021, which claims priority to Chinese Patent Application No. 202010707669.X, filed on Jul. 21, 2020. The disclosures of the aforementioned applications are hereby incorporated by reference in their entireties.

TECHNICAL FIELD

The present disclosure relates to an electronic device, and in particular, to an echo filtering method, an electronic device, and a computer-readable storage medium.

BACKGROUND

With the improvement of consumers' requirements for operation experience and voice interaction, there are more electronic devices including an intelligent voice assistant and a call function, for example, a smart screen, a smart acoustic system, a smart robot, an in-vehicle voice assistant, a smartphone, and a tablet computer. However, echo of sound played by a speaker of the electronic device is usually captured by a microphone. This affects a wakeup engine and/or call quality of the intelligent assistant. The sound played by the speaker may reach the microphone of the electronic device in two manners. In one manner, the sound is reflected through an environment such as a wall, and a formed reflected echo may be captured by the microphone. In another manner, the sound played by a plurality of speakers is directly transmitted as the echo to the microphone of the electronic device without any reflection.

To wake up a voice assistant (voice interaction enhancement) or perform a voice call when the speaker of the electronic device plays music or a television program, these electronic devices usually use an acoustic echo cancellation (AEC) algorithm to cancel a signal component that is in an audio signal captured by the microphone and that is associated with the echo of the sound played by the speaker. However, in some cases, using the conventional AEC algorithm to cancel the echo played by the speaker is still unsatisfactory, and further improvement is required.

SUMMARY

In view of the foregoing problem, embodiments of the present disclosure provide an echo filtering technology.

According to a first aspect of the disclosure, an echo filtering method is provided. The method is applied to an electronic device. The electronic device includes M microphones and N speakers. M and N are integers greater than 1. The method includes: obtaining N speaker signals corresponding to the N speakers; obtaining M microphone signals corresponding to the M microphones; and performing at least direct sound filtering on the N speaker signals and the M microphone signals to obtain a target signal. The direct sound filtering indicates filtering an audio component directly output from the N speakers to the M microphones without environmental reflection. Direct sound filtering can further improve echo filtering effect.

In some embodiments, the target signal is used by a wakeup engine to wake up an intelligent voice assistant or is transmitted to another electronic device for a voice call. In some embodiments, the target signal includes fewer echo components than the M microphone signals. The echo components are used to represent echo of sound propagated in space that is of the N speaker signals and that is captured by the M microphones. By using the target signal obtained through direct sound filtering, a success rate of waking up the intelligent voice assistant by the wakeup engine can be improved, and/or quality of the voice call can be improved.

In some embodiments, the method further includes: enabling a display of the electronic device to display a customized direct sound filtering interface; receiving user input of a user in the customized direct sound filtering interface; in response to the user input, obtaining N speaker test signals and enabling the N speakers to play the N speaker test signals; obtaining M microphone test signals corresponding to the M microphones; and storing a customized direct sound filtering model. The customized direct sound filtering model is obtained based on the N speaker test signals and the M microphone test signals, and the customized direct sound filtering model is used for the direct sound filtering. In some embodiments, the method further includes: performing customized direct sound filtering on the N speaker signals and the M microphone signals by using the customized direct sound filtering model to obtain the target signal. By using the customized direct sound filtering, the direct sound filtering can be optimized based on a customer's environment, and echo filtering in the customer's environment can be further improved.

In some embodiments, the customized direct sound filtering interface displays an indicator for indicating to keep an environment quiet. The customized direct sound filtering interface may further display a decibel indicator indicating environmental noise and/or an indicator indicating whether customized echo filtering is suitable. By displaying the indicator for indicating to keep the environment quiet, the decibel indicator, and/or the indicator indicating whether customized echo filtering is suitable, the user can establish a customized direct sound filtering model in a quiet and suitable environment. This lays a good basis for subsequent customized direct sound filtering specific to the environment, and subsequently obtains good echo filtering effect in the environment. In some embodiments, the direct sound filtering includes default direct sound filtering. The default direct sound filtering indicates filtering based at least on a model relationship between N speaker signals played by the N speakers and M microphone signals directly captured by the M microphones in a fully muted environment.

In some embodiments, the method further includes: generating reverse speaker signals based on the N speaker signals; and enabling a reverse speaker close to the M microphones to play reverse audio based on the reverse speaker signals to cancel echo of audio output played by the N speakers corresponding to the N speaker signals. The reverse speaker is different from the N speakers. By enabling the reverse speaker to play the reverse audio, a part of the echo components may be filtered before the echo is captured by the microphone, thereby providing the echo filtering effect.

In some embodiments, the method further includes: generating an echo estimation signal based on the N speaker signals; filtering the echo estimation signal from M microphone signals to generate a residual signal; and obtaining the target signal. The obtaining the target signal includes: performing the direct sound filtering on the residual signal to obtain the target signal. The echo filtering effect can be further enhanced by preprocessing a microphone signal before the direct sound filtering to filter the echo estimation signal.

In some embodiments, the generating an echo estimation signal includes: performing non-interleaved preprocessing on the N speaker signals to generate at least one preprocessed signal; and performing adaptive filtering on the at least one preprocessed signal to generate the echo estimation signal. By preprocessing the N speaker signals in the non-interleaved manner, a preprocessed signal that continuously represents the echo in terms of time may be obtained. Better echo filtering effect may be achieved by estimating the echo component in the M microphone signals by using an adaptive filtering signal based on the non-interleaved preprocessed signal.

In some embodiments, generating the at least one preprocessed signal includes: performing linear summation on at least two speaker signals of the N speaker signals to generate a summation signal. By combining the at least two speaker signals of the N speaker signals into the single summation signal, computation overheads of subsequent adaptive filtering can be reduced. This reduces overall computation overheads. Echo filtering is performed in a full frequency band to obtain better echo filtering effect.

In some embodiments, generating the at least one preprocessed signal further includes: performing linear difference on the at least two speaker signals of the N speaker signals to generate a difference signal. In some cases, echo filtering focuses on the difference between output of a frequency band or different speakers. In this case, the difference signal may be separately provided to a processor or combined with another signal to further improve the echo filtering effect.

In some embodiments, generating the at least one preprocessed signal further includes: sorting the summation signal and the difference signal. The generating an echo estimation signal further includes: sequentially performing adaptive filtering on the sorted summation signal and the sorted difference signal to generate a corresponding sorted echo estimation signal. Generating the residual signal includes: sequentially filtering the corresponding sorted echo estimation signal from the M microphone signals to generate the residual signal. By sorting the summation signal and the difference signal and generating the residual signal accordingly, better echo filtering effect can be achieved for different cases.

In some embodiments, generating the at least one preprocessed signal includes: generating sorted N preprocessed signals by sorting the N speaker signals. Generating an echo estimation signal includes: sequentially performing adaptive filtering on the sorted N preprocessed signals to generate corresponding sorted N echo estimation signals. Generating the residual signal includes: sequentially filtering the corresponding sorted N echo estimation signals from the M microphone signals to generate the residual signal. The N speaker signals are sorted and sequentially filtered, so that a signal that generates large distortion can be preferentially filtered, to provide the echo filtering effect.

In some embodiments, the sorting the N speaker signals includes sorting the N speaker signals based on a low frequency component of each speaker signal of the N speaker signals. The echo filtering effect can be improved by preferentially filtering a speaker signal of the low frequency component.

In some embodiments, generating the at least one preprocessed signal includes: performing the non-interleaved preprocessing on the N speaker signals and the M microphone signals to generate the at least one preprocessed signal. By using the M microphone signals as auxiliary reference signals, a frequency band with large echo may be limited, to assist in improving echo filtering.

In some embodiments, the method further includes adjusting a gain of at least one of the N speaker signals, the M microphone signals, and the at least one preprocessed signal, so that a gain of the echo estimation signal matches the gain of the M microphone signals. By adjusting the gain, the gain of the echo estimation signal may match the gain of the M microphone signals, thereby improving adaptive filtering effect and the echo filtering effect.

According to a second aspect of the disclosure, an echo filtering method is provided. The method is applied to an electronic device. The electronic device includes M microphones, N speakers, and at least one reverse speaker. M and N are integers greater than 1. The method includes: obtaining N speaker signals corresponding to the N speakers; generating reverse speaker signals based on the N speaker signals; and enabling at least one reverse speaker close to at least one of the M microphones to play reverse audio based on the reverse speaker signals to cancel audio output played by the N speakers corresponding to the N speaker signals. The at least one reverse speaker is different from the N speakers. By enabling the reverse speaker to play the reverse audio, a part of the echo components may be filtered before the echo is captured by the microphone, thereby providing the echo filtering effect. In some implementations, the at least one reverse speaker may be M reverse speakers. M represents a quantity of the M microphones. In some other implementations, the at least one reverse speaker may be fewer or more reverse speakers than the M reverse speakers.

In some embodiments, the method further includes: obtaining M microphone signals corresponding to the M microphones; and performing at least direct sound filtering on the N speaker signals and the M microphone signals to obtain a target signal. The direct sound filtering indicates filtering an audio component directly output from the N speakers to the M microphones without environmental reflection. Direct sound filtering can further improve echo filtering effect.

In some embodiments, the target signal is used by a wakeup engine to wake up an intelligent voice assistant or is transmitted to another electronic device for a voice call. In some embodiments, the target signal includes fewer echo components than the M microphone signals. The echo components are used to represent echo of audio output propagated in space that is of the N speaker signals and that is captured by the M microphones. By using the target signal obtained through direct sound filtering, a success rate of waking up the intelligent voice assistant by the wakeup engine can be improved, and/or quality of the voice call can be improved.

In some embodiments, the direct sound filtering includes default direct sound filtering. The default direct sound filtering indicates filtering based at least on a model relationship between N speaker signals played by the N speakers and M microphone signals directly captured by the M microphones in a fully muted environment.

In some embodiments, the method further includes: enabling a display of the electronic device to display a customized direct sound filtering interface; receiving user input of a user in the customized direct sound filtering interface; in response to the user input, obtaining N speaker test signals and enabling the N speakers to play the N speaker test signals; obtaining M microphone test signals corresponding to the M microphones; and storing a customized direct sound filtering model. The customized direct sound filtering model is obtained based on the N speaker test signals and the M microphone test signals, and the customized direct sound filtering model is used for the direct sound filtering. In some embodiments, the method further includes: performing customized direct sound filtering on the N speaker signals and the M microphone signals by using the customized direct sound filtering model to obtain the target signal. By using the customized direct sound filtering, the direct sound filtering can be optimized based on a customer's environment, and echo filtering in the customer's environment can be further improved.

In some embodiments, the customized direct sound filtering interface displays an indicator for indicating to keep an environment quiet. The customized direct sound filtering interface may further display a decibel indicator indicating environmental noise and/or an indicator indicating whether customized echo filtering is suitable. By displaying the indicator for indicating to keep the environment quiet, the decibel indicator, and/or the indicator indicating whether customized echo filtering is suitable, the user can establish a customized direct sound filtering model in a quiet and suitable environment. This lays a good basis for subsequent customized direct sound filtering specific to the environment, and subsequently obtains good echo filtering effect in the environment.

In some embodiments, the method further includes: generating an echo estimation signal based on the N speaker signals; filtering the echo estimation signal from M microphone signals to generate a residual signal; and obtaining the target signal. The obtaining the target signal includes: performing the direct sound filtering on the residual signal to obtain the target signal. The echo filtering effect can be further enhanced by preprocessing a microphone signal before the direct sound filtering to filter the echo estimation signal.

In some embodiments, the generating an echo estimation signal includes: performing non-interleaved preprocessing on the N speaker signals to generate at least one preprocessed signal; and performing adaptive filtering on the at least one preprocessed signal to generate the echo estimation signal. By preprocessing the N speaker signals in the non-interleaved manner, a preprocessed signal that continuously represents the echo in terms of time may be obtained. Better echo filtering effect may be achieved by estimating the echo component in the M microphone signals by using an adaptive filtering signal based on the non-interleaved preprocessed signal.

In some embodiments, generating the at least one preprocessed signal includes: performing linear summation on at least two speaker signals of the N speaker signals to generate a summation signal. By combining the at least two speaker signals of the N speaker signals into the single summation signal, computation overheads of subsequent adaptive filtering can be reduced. This reduces overall computation overheads. Echo filtering is performed in a full frequency band to obtain better echo filtering effect.

In some embodiments, generating the at least one preprocessed signal further includes: performing linear difference on the at least two speaker signals of the N speaker signals to generate a difference signal. In some cases, echo filtering focuses on the difference between output of a frequency band or different speakers. In this case, the difference signal may be separately provided to a processor or combined with another signal to further improve the echo filtering effect.

In some embodiments, generating the at least one preprocessed signal further includes: sorting the summation signal and the difference signal. Generating an echo estimation signal further includes: sequentially performing adaptive filtering on the sorted summation signal and the sorted difference signal to generate corresponding sorted echo estimation signals. Generating the residual signal includes: sequentially filtering the corresponding sorted echo estimation signal from the M microphone signals to generate the residual signal. By sorting the summation signal and the difference signal and generating the residual signal accordingly, better echo filtering effect can be achieved for different cases.

In some embodiments, generating the at least one preprocessed signal includes: generating sorted N preprocessed signals by sorting the N speaker signals. The generating an echo estimation signal includes: sequentially performing adaptive filtering on the sorted N preprocessed signals to generate corresponding sorted N echo estimation signals. Generating the residual signal includes: sequentially filtering the N echo estimation signals from the M microphone signals to generate the residual signal. The N speaker signals are sorted and sequentially filtered, so that a signal that generates large distortion can be preferentially filtered, to provide the echo filtering effect.

In some embodiments, the sorting the N speaker signals includes sorting the N speaker signals based on a low frequency component of each speaker signal of the N speaker signals. The echo filtering effect can be improved by preferentially filtering a speaker signal of the low frequency component.

In some embodiments, generating the at least one preprocessed signal includes: performing the non-interleaved preprocessing on the N speaker signals and the M microphone signals to generate the at least one preprocessed signal. By using the M microphone signals as auxiliary reference signals, a frequency band with large echo may be limited, to assist in improving echo filtering.

In some embodiments, the method further includes adjusting a gain of at least one of the N speaker signals, the M microphone signals, and the at least one preprocessed signal, so that a gain of the echo estimation signal matches the gain of the M microphone signals. By adjusting the gain, the gain of the echo estimation signal may match the gain of the M microphone signals, thereby improving adaptive filtering effect and the echo filtering effect.

According to a third aspect of the disclosure, an echo filtering method is provided. The method is applied to an electronic device. The electronic device includes M microphones and N speakers. M and N are integers greater than 1. The method includes: obtaining N speaker signals corresponding to the N speakers; obtaining M microphone signals corresponding to the M microphones; performing non-interleaved preprocessing on the N speaker signals to generate M groups of preprocessed signals; performing adaptive filtering on the M groups of preprocessed signals to generate M echo estimation signals; and filtering the M echo estimation signals from the M microphone signals to obtain a residual signal. By preprocessing the N speaker signals in the non-interleaved manner, a preprocessed signal that continuously represents the echo in terms of time may be obtained. Better echo filtering effect may be achieved by estimating the echo component in the M microphone signals by using an adaptive filtering signal based on the non-interleaved preprocessed signal.

In some embodiments, the residual signal is a target signal. The target signal is used by a wakeup engine to wake up an intelligent voice assistant or is transmitted to another electronic device for a voice call. In some embodiments, the target signal includes fewer echo components than the M microphone signals. The echo components are used to represent echo of sound propagated in space that is of the N speaker signals and that is captured by the M microphones. By using the target signal obtained through non-interleaved preprocessing, a success rate of waking up the intelligent voice assistant by the wakeup engine can be improved, and/or quality of the voice call can be improved.

In some embodiments, generating the at least one preprocessed signal includes: performing linear summation on at least two speaker signals of the N speaker signals to generate a summation signal. By combining the at least two speaker signals of the N speaker signals into the single summation signal, computation overheads of subsequent adaptive filtering can be reduced. This reduces overall computation overheads. Echo filtering is performed in a full frequency band to obtain better echo filtering effect.

In some embodiments, generating the at least one preprocessed signal includes: performing linear difference on the at least two speaker signals of the N speaker signals to generate a difference signal. In some cases, echo filtering focuses on the difference between output of a frequency band or different speakers. In this case, the difference signal may be separately provided to a processor or combined with another signal to further improve the echo filtering effect.

In some embodiments, generating the at least one preprocessed signal further includes: sorting the summation signal and the difference signal. Generating the at least one echo estimation signal includes: sequentially performing adaptive filtering on the sorted summation signal and the sorted difference signal to sequentially generate a correspondingly sorted adaptive filtering signal. Generating the residual signal includes: sequentially filtering the corresponding sorted adaptive filtering signal from the M microphone signals to generate the residual signal. The summation signal and the difference signal are sorted and sequentially filtered, so that a signal that generates large distortion can be preferentially filtered, to provide the echo filtering effect.

In some embodiments, generating the at least one preprocessed signal includes: generating sorted N preprocessed signals by sorting the N speaker signals. Generating the at least one echo estimation signal includes: sequentially performing adaptive filtering on the sorted N preprocessed signals to generate corresponding sorted echo estimation signals. Generating the target signal includes: sequentially filtering the correspondingly sorted echo estimation signals from the M microphone signals to generate the target signal. The N speaker signals are sorted and sequentially filtered, so that a signal that generates large distortion can be preferentially filtered, to provide the echo filtering effect.

In some embodiments, the sorting the N speaker signals includes sorting the N speaker signals based on a low frequency component of each speaker signal of the N speaker signals. The echo filtering effect can be improved by preferentially filtering a speaker signal of the low frequency component.

In some embodiments, generating the at least one preprocessed signal includes: performing the non-interleaved preprocessing on the N speaker signals and the M microphone signals to generate the at least one preprocessed signal. By using the M microphone signals as auxiliary reference signals, a frequency band with large echo may be limited, to assist in improving echo filtering.

In some embodiments, the method further includes adjusting a gain of at least one of the N speaker signals, the M microphone signals, and the at least one preprocessed signal, so that a gain of the at least one echo estimation signal matches the gain of the M microphone signals. By adjusting the gain, the gain of the echo estimation signal may match the gain of the M microphone signals, thereby improving adaptive filtering effect and the echo filtering effect.

In some embodiments, generating the at least one echo estimation signal includes, in a case of a plurality of preprocessed signals, performing parallel adaptive filtering on the plurality of preprocessed signals to generate the at least one echo estimation signal. For the plurality of preprocessed signals with low similarity, parallel preprocessing can improve the echo filtering effect.

In some embodiments, generating the at least one echo estimation signal includes converting the at least one preprocessed signal from a time domain signal to a frequency domain signal, and performing the adaptive filtering on the frequency domain signal to obtain the at least one echo estimation signal. Computation overheads of the adaptive filtering may be reduced by converting the preprocessed signal from time domain to frequency domain.

In some embodiments, the method includes: performing direct sound filtering on the residual signal to generate the target signal. The direct sound filtering indicates filtering an audio component directly output from the N speakers to the M microphones without environmental reflection. More specifically, the direct sound filtering indicates filtering based on a model relationship between a sound source signal played by at least one of a first speaker and a second speaker and an audio input signal directly captured by a microphone. Direct sound filtering can further improve echo filtering effect.

In some embodiments, generating the target signal includes: performing default direct sound filtering on the residual signal to generate the target signal. The default direct sound filtering indicates filtering based at least on a model relationship between the sound source signal played by the N speakers and the audio input signal directly captured by the M microphones in a fully muted environment.

In some embodiments, the method further includes: enabling a display of the electronic device to display a customized direct sound filtering interface; receiving user input of a user in the customized direct sound filtering interface; in response to the user input, obtaining N speaker test signals and enabling the N speakers to play the N speaker test signals; obtaining M microphone test signals corresponding to the M microphones; and storing a customized direct sound filtering model. The customized direct sound filtering model is obtained based on the N speaker test signals and the M microphone test signals, and the customized direct sound filtering model is used for the direct sound filtering. In some embodiments, the method further includes: performing customized direct sound filtering on the N speaker signals and the M microphone signals by using the customized direct sound filtering model to obtain the target signal. By using the customized direct sound filtering, the direct sound filtering can be optimized based on a customer's environment, and echo filtering in the customer's environment can be further improved.

In some embodiments, the method further includes: generating a reverse audio signal based on the N speaker signals; and enabling a reverse speaker close to the microphone to play reverse audio based on the reverse audio signal to cancel audio output played by at least one of the N speakers. The reverse speaker is different from the first speaker and the second speaker. By enabling the reverse speaker to play the reverse audio, a part of the echo components may be filtered before the echo is captured by the microphone, thereby providing the echo filtering effect.

According to a fourth aspect of the present disclosure, an electronic device is provided. The electronic device includes N speakers, M microphones, one or more processors, and a memory that stores one or more programs. The one or more processors obtain N speaker signals corresponding to the N speakers and M microphone signals corresponding to the M microphones. The one or more programs are configured to be executed by the one or more processors. The one or more programs include instructions used to execute the method according to the first aspect.

According to a fifth aspect of the present disclosure, an electronic device is provided. The electronic device includes N speakers, M microphones, at least one reverse speaker, one or more processors, and a memory storing one or more programs. The one or more processors obtain N speaker signals corresponding to the N speakers and M microphone signals corresponding to the M microphones, and enable the at least one reverse speaker to play reverse audio. The one or more programs are configured to be executed by the one or more processors. The one or more programs include instructions used to execute the method according to the second aspect. In some implementations, the at least one reverse speaker may be M reverse speakers. M represents a quantity of the M microphones. In some other implementations, the at least one reverse speaker may be fewer or more reverse speakers than the M reverse speakers.

According to a sixth aspect of the present disclosure, an electronic device is provided. The electronic device includes N speakers, M microphones, at least one reverse speaker, one or more processors, and a memory storing one or more programs. The one or more programs are configured to be executed by the one or more processors. The one or more programs include instructions used to execute the method according to the third aspect.

According to a seventh aspect of this disclosure, a computer-readable storage medium is provided. The computer-readable storage medium stores one or more programs. The one or more programs are configured to be executed by one or more processors of an electronic device. The one or more programs include instructions used to execute the method according to the first aspect.

According to an eighth aspect of this disclosure, a computer-readable storage medium is provided. The computer-readable storage medium stores one or more programs. The one or more programs are configured to be executed by one or more processors of an electronic device. The one or more programs include an instruction used to execute the method according to the second aspect.

According to a ninth aspect of this disclosure, a computer-readable storage medium is provided. The computer-readable storage medium stores one or more programs. The one or more programs are configured to be executed by one or more processors of an electronic device. The one or more programs include instructions used to execute the method according to the third aspect.

According to a tenth aspect of the disclosure, an echo filtering apparatus is provided. The apparatus is used in an electronic device. The electronic device includes M microphones and N speakers. M and N are integers greater than 1. The apparatus includes: a first obtaining module, configured to obtain N speaker signals corresponding to the N speakers; a second obtaining module, configured to obtain M microphone signals corresponding to the M microphones; and a direct sound filtering module, configured to perform at least direct sound filtering on the N speaker signals and the M microphone signals to obtain a target signal. The direct sound filtering indicates filtering an audio component directly output from the N speakers to the M microphones without environmental reflection. Direct sound filtering can further improve echo filtering effect.

In some embodiments, the target signal is used by a wakeup engine to wake up an intelligent voice assistant or is transmitted to another electronic device for a voice call. In some embodiments, the target signal includes fewer echo components than the M microphone signals. The echo components are used to represent echo of sound propagated in space that is of the N speaker signals and that is captured by the M microphones. By using the target signal obtained through direct sound filtering, a success rate of waking up the intelligent voice assistant by the wakeup engine can be improved, and/or quality of the voice call can be improved.

In some embodiments, the apparatus further includes: a display enabling module, configured to enable a display of the electronic device to display a customized direct sound filtering interface; an input receiving module, configured to receive user input of a user in the customized direct sound filtering interface; a speaker test module, configured to: in response to the user input, obtain N speaker test signals and enable the N speakers to play the N speaker test signals; a third obtaining module, configured to obtain M microphone test signals corresponding to the M microphones; and a storage module, configured to store a customized direct sound filtering model. The customized direct sound filtering model is obtained based on the N speaker test signals and the M microphone test signals, and the customized direct sound filtering model is used for the direct sound filtering. In some embodiments, the apparatus further includes a customized direct sound filtering module, configured to perform customized direct sound filtering on the N speaker signals and the M microphone signals by using the customized direct sound filtering model, to obtain the target signal. By using the customized direct sound filtering, the direct sound filtering can be optimized based on a customer's environment, and echo filtering in the customer's environment can be further improved.

In some embodiments, the customized direct sound filtering interface displays an indicator for indicating to keep an environment quiet. The customized direct sound filtering interface may further display a decibel indicator indicating environmental noise and/or an indicator indicating whether customized echo filtering is suitable. By displaying the indicator for indicating to keep the environment quiet, the decibel indicator, and/or the indicator indicating whether customized echo filtering is suitable, the user can establish a customized direct sound filtering model in a quiet and suitable environment. This lays a good basis for subsequent customized direct sound filtering specific to the environment, and subsequently obtains good echo filtering effect in the environment. In some embodiments, the direct sound filtering includes default direct sound filtering. The default direct sound filtering indicates filtering based at least on a model relationship between N speaker signals played by the N speakers and M microphone signals directly captured by the M microphones in a fully muted environment.

In some embodiments, the apparatus further includes: a reverse speaker signal generation module, configured to generate reverse speaker signals based on the N speaker signals; and a play enabling module, configured to enable a reverse speaker close to at least one of the M microphones to play reverse audio based on the reverse speaker signals to cancel echo of audio output played by the N speakers corresponding to the N speaker signals. The reverse speaker is different from the N speakers. By enabling the reverse speaker to play the reverse audio, a part of the echo components may be filtered before the echo is captured by the microphone, thereby providing the echo filtering effect.

In some embodiments, the apparatus further includes: an echo estimation module, configured to generate an echo estimation signal based on the N speaker signals; a residual signal generation module, configured to filter the echo estimation signal from M microphone signals to generate a residual signal; and a target signal generation module, configured to perform direct sound filtering on the residual signal to obtain a target signal. The echo filtering effect can be further enhanced by preprocessing a microphone signal before the direct sound filtering to filter the echo estimation signal.

In some embodiments, the echo estimation module includes: a preprocessed signal generation module, configured to perform non-interleaved preprocessing on the N speaker signals to generate at least one preprocessed signal; and an adaptive filtering module, configured to perform adaptive filtering on the at least one preprocessed signal to generate the echo estimation signal. By preprocessing the N speaker signals in the non-interleaved manner, a preprocessed signal that continuously represents the echo in terms of time may be obtained. Better echo filtering effect may be achieved by estimating the echo component in the M microphone signals by using an adaptive filtering signal based on the non-interleaved preprocessed signal.

In some embodiments, the preprocessed signal generation module includes a summation module, configured to perform linear summation on at least two speaker signals of the N speaker signals to generate a summation signal. By combining the at least two speaker signals of the N speaker signals into the single summation signal, computation overheads of subsequent adaptive filtering can be reduced. This reduces overall computation overheads. Echo filtering is performed in a full frequency band to obtain better echo filtering effect.

In some embodiments, the preprocessed signal generation module further includes a difference module, configured to perform linear difference on the at least two speaker signals of the N speaker signals to generate a difference signal. In some cases, echo filtering focuses on the difference between output of a frequency band or different speakers. In this case, the difference signal may be separately provided to a processor or combined with another signal to further improve the echo filtering effect.

In some embodiments, the preprocessed signal generation module further includes a sorting module, configured to sort the summation signal and the difference signal. The echo estimation module further includes a sequential adaptive filtering module, configured to sequentially perform adaptive filtering on the sorted summation signal and the sorted difference signal, to generate a corresponding sorted echo estimation signal. The residual signal generation module includes a residual signal sequential generation module, configured to sequentially filter the corresponding sorted echo estimation signal from the M microphone signals to generate the residual signal. By sorting the summation signal and the difference signal and generating the residual signal accordingly, better echo filtering effect can be achieved for different cases.

In some embodiments, the preprocessed signal generation module includes a speaker signal sorting module, configured to generate sorted N preprocessed signals by sorting the N speaker signals. The echo estimation module includes the sequential adaptive filtering module, configured to sequentially perform adaptive filtering on the sorted N preprocessed signals to generate corresponding sorted N echo estimation signals. The residual signal generation module includes the residual signal sequential generation module, configured to sequentially filter the corresponding sorted N echo estimation signals from the M microphone signals to generate the residual signal. The N speaker signals are sorted and sequentially filtered, so that a signal that generates large distortion can be preferentially filtered, to provide the echo filtering effect.

In some embodiments, the sorting the N speaker signals includes sorting the N speaker signals based on a low frequency component of each speaker signal of the N speaker signals. The echo filtering effect can be improved by preferentially filtering a speaker signal of the low frequency component.

In some embodiments, the preprocessed signal generation module is further configured to perform the non-interleaved preprocessing on the N speaker signals and the M microphone signals to generate the at least one preprocessed signal. By using the M microphone signals as auxiliary reference signals, a frequency band with large echo may be limited, to assist in improving echo filtering.

In some embodiments, the apparatus further includes a gain adjusting module, configured to adjust a gain of at least one of the N speaker signals, the M microphone signals, and the at least one preprocessed signal, so that a gain of the echo estimation signal matches the gain of the M microphone signals. By adjusting the gain, the gain of the echo estimation signal may match the gain of the M microphone signals, thereby improving adaptive filtering effect and the echo filtering effect.

According to an eleventh aspect of the disclosure, an echo filtering apparatus is provided. The apparatus is used in an electronic device. The electronic device includes M microphones, N speakers, and at least one reverse speaker. M and N are integers greater than 1. The apparatus includes: a first obtaining module, configured to obtain N speaker signals corresponding to the N speakers; a reverse speaker signal generation module, configured to generate reverse speaker signals based on the N speaker signals; and a play enabling module, configured to enable at least one reverse speaker close to at least one of the M microphones to play reverse audio based on the reverse speaker signals to cancel audio output played by the N speakers corresponding to the N speaker signals. The at least one reverse speaker is different from the N speakers. By enabling the reverse speaker to play the reverse audio, a part of the echo components may be filtered before the echo is captured by the microphone, thereby providing the echo filtering effect. In some implementations, the at least one reverse speaker may be M reverse speakers. M represents a quantity of the M microphones. In some other implementations, the at least one reverse speaker may be fewer or more reverse speakers than the M reverse speakers.

In some embodiments, the apparatus further includes a second obtaining module, configured to obtain M microphone signals corresponding to the M microphones; and a direct sound filtering module, configured to perform at least direct sound filtering on the N speaker signals and the M microphone signals to obtain a target signal. The direct sound filtering indicates filtering an audio component directly output from the N speakers to the M microphones without environmental reflection. Direct sound filtering can further improve echo filtering effect.

In some embodiments, the target signal is used by a wakeup engine to wake up an intelligent voice assistant or is transmitted to another electronic device for a voice call. In some embodiments, the target signal includes fewer echo components than the M microphone signals. The echo components are used to represent echo of audio output propagated in space that is of the N speaker signals and that is captured by the M microphones. By using the target signal obtained through direct sound filtering, a success rate of waking up the intelligent voice assistant by the wakeup engine can be improved, and/or quality of the voice call can be improved.

In some embodiments, the direct sound filtering module includes a default direct sound filtering module. The default direct sound filtering indicates filtering based at least on a model relationship between N speaker signals played by the N speakers and M microphone signals directly captured by the M microphones in a fully muted environment.

In some embodiments, the apparatus further includes: a display enabling module, configured to enable a display of the electronic device to display a customized direct sound filtering interface; an input receiving module, configured to receive user input of a user in the customized direct sound filtering interface; a speaker test module, configured to: in response to the user input, obtain N speaker test signals and enable the N speakers to play the N speaker test signals; a third obtaining module, configured to obtain M microphone test signals corresponding to the M microphones; and a storage module, configured to store a customized direct sound filtering model. The customized direct sound filtering model is obtained based on the N speaker test signals and the M microphone test signals, and the customized direct sound filtering model is used for the direct sound filtering. In some embodiments, the apparatus further includes: performing customized direct sound filtering on the N speaker signals and the M microphone signals by using the customized direct sound filtering model to obtain the target signal. By using the customized direct sound filtering, the direct sound filtering can be optimized based on a customer's environment, and echo filtering in the customer's environment can be further improved.

In some embodiments, the customized direct sound filtering interface displays an indicator for indicating to keep an environment quiet. The customized direct sound filtering interface may further display a decibel indicator indicating environmental noise and/or an indicator indicating whether customized echo filtering is suitable. By displaying the indicator for indicating to keep the environment quiet, the decibel indicator, and/or the indicator indicating whether customized echo filtering is suitable, the user can establish a customized direct sound filtering model in a quiet and suitable environment. This lays a good basis for subsequent customized direct sound filtering specific to the environment, and subsequently obtains good echo filtering effect in the environment.

In some embodiments, the apparatus further includes: an echo estimation module, configured to generate an echo estimation signal based on the N speaker signals; a residual signal generation module, configured to filter the echo estimation signal from M microphone signals to generate a residual signal; and a target signal generation module, configured to perform direct sound filtering on the residual signal to obtain a target signal. The echo filtering effect can be further enhanced by preprocessing a microphone signal before the direct sound filtering to filter the echo estimation signal.

In some embodiments, the echo estimation module includes: a preprocessed signal generation module, configured to perform non-interleaved preprocessing on the N speaker signals to generate at least one preprocessed signal; and an adaptive filtering module, configured to perform adaptive filtering on the at least one preprocessed signal to generate the echo estimation signal. By preprocessing the N speaker signals in the non-interleaved manner, a preprocessed signal that continuously represents the echo in terms of time may be obtained. Better echo filtering effect may be achieved by estimating the echo component in the M microphone signals by using an adaptive filtering signal based on the non-interleaved preprocessed signal.

In some embodiments, the preprocessed signal generation module includes a summation module, configured to perform linear summation on at least two speaker signals of the N speaker signals to generate a summation signal. By combining the at least two speaker signals of the N speaker signals into the single summation signal, computation overheads of subsequent adaptive filtering can be reduced. This reduces overall computation overheads. Echo filtering is performed in a full frequency band to obtain better echo filtering effect.

In some embodiments, the preprocessed signal generation module further includes a difference module, configured to perform linear difference on the at least two speaker signals of the N speaker signals to generate a difference signal. In some cases, echo filtering focuses on the difference between output of a frequency band or different speakers. In this case, the difference signal may be separately provided to a processor or combined with another signal to further improve the echo filtering effect.

In some embodiments, the preprocessed signal generation module further includes a sorting module, configured to sort the summation signal and the difference signal. The echo estimation module further includes a sequential adaptive filtering module, configured to sequentially perform adaptive filtering on the sorted summation signal and the sorted difference signal, to generate a corresponding sorted echo estimation signal. The residual signal generation module includes a residual signal sequential generation module, configured to sequentially filter the corresponding sorted echo estimation signal from the M microphone signals to generate the residual signal. By sorting the summation signal and the difference signal and generating the residual signal accordingly, better echo filtering effect can be achieved for different cases.

In some embodiments, the preprocessed signal generation module includes a speaker signal sorting module, configured to generate sorted N preprocessed signals by sorting the N speaker signals. The echo estimation module includes the sequential adaptive filtering module, configured to sequentially perform adaptive filtering on the sorted N preprocessed signals to generate corresponding sorted N echo estimation signals. The residual signal generation module includes the residual signal sequential generation module, configured to sequentially filter the corresponding sorted N echo estimation signals from the M microphone signals to generate the residual signal. The N speaker signals are sorted and sequentially filtered, so that a signal that generates large distortion can be preferentially filtered, to provide the echo filtering effect.

In some embodiments, the sorting the N speaker signals includes sorting the N speaker signals based on a low frequency component of each speaker signal of the N speaker signals. The echo filtering effect can be improved by preferentially filtering a speaker signal of the low frequency component.

In some embodiments, the preprocessed signal generation module is further configured to perform the non-interleaved preprocessing on the N speaker signals and the M microphone signals to generate the at least one preprocessed signal. By using the M microphone signals as auxiliary reference signals, a frequency band with large echo may be limited, to assist in improving echo filtering.

In some embodiments, the apparatus further includes a gain adjusting module, configured to adjust a gain of at least one of the N speaker signals, the M microphone signals, and the at least one preprocessed signal, so that a gain of the echo estimation signal matches the gain of the M microphone signals. By adjusting the gain, the gain of the echo estimation signal may match the gain of the M microphone signals, thereby improving adaptive filtering effect and the echo filtering effect.

According to a twelfth aspect of the present disclosure, an echo filtering apparatus is provided. The apparatus is used in an electronic device. The electronic device includes M microphones and N speakers. M and N are integers greater than 1. The apparatus includes a first obtaining module, configured to obtain N speaker signals corresponding to the N speakers; a second obtaining module, configured to obtain M microphone signals corresponding to the M microphones; a preprocessed signal generation module, configured to perform non-interleaved preprocessing on the N speaker signals to generate M groups of preprocessed signals; an echo estimation module, configured to perform adaptive filtering on the M groups of preprocessed signals to generate M echo estimation signals; and a residual signal generation module, configured to filter the M echo estimation signals from the M microphone signals to obtain a residual signal. By preprocessing the N speaker signals in the non-interleaved manner, a preprocessed signal that continuously represents the echo in terms of time may be obtained. Better echo filtering effect may be achieved by estimating the echo component in the M microphone signals by using an adaptive filtering signal based on the non-interleaved preprocessed signal.

In some embodiments, the residual signal is a target signal. The target signal is used by a wakeup engine to wake up an intelligent voice assistant or is transmitted to another electronic device for a voice call. In some embodiments, the target signal includes fewer echo components than the M microphone signals. The echo components are used to represent echo of sound propagated in space that is of the N speaker signals and that is captured by the M microphones. By using the target signal obtained through non-interleaved preprocessing, a success rate of waking up the intelligent voice assistant by the wakeup engine can be improved, and/or quality of the voice call can be improved.

In some embodiments, the preprocessed signal generation module includes a summation module, configured to perform linear summation on at least two speaker signals of the N speaker signals to generate a summation signal. By combining the at least two speaker signals of the N speaker signals into the single summation signal, computation overheads of subsequent adaptive filtering can be reduced. This reduces overall computation overheads. Echo filtering is performed in a full frequency band to obtain better echo filtering effect.

In some embodiments, the preprocessed signal generation module further includes a difference module, configured to perform linear difference on the at least two speaker signals of the N speaker signals to generate a difference signal. In some cases, echo filtering focuses on the difference between output of a frequency band or different speakers. In this case, the difference signal may be separately provided to a processor or combined with another signal to further improve the echo filtering effect.

In some embodiments, the preprocessed signal generation module further includes a sorting module, configured to sort the summation signal and the difference signal. The echo estimation module further includes a sequential adaptive filtering module, configured to sequentially perform adaptive filtering on the sorted summation signal and the sorted difference signal, to generate a corresponding sorted echo estimation signal. The residual signal generation module includes a residual signal sequential generation module, configured to sequentially filter the corresponding sorted echo estimation signal from the M microphone signals to generate the residual signal. The summation signal and the difference signal are sorted and sequentially filtered, so that a signal that generates large distortion can be preferentially filtered, to provide the echo filtering effect.

In some embodiments, the preprocessed signal generation module includes a speaker signal sorting module, configured to generate sorted N preprocessed signals by sorting the N speaker signals. The echo estimation module includes the sequential adaptive filtering module, configured to sequentially perform adaptive filtering on the sorted N preprocessed signals to generate a corresponding sorted echo estimation signal. The target signal generation module includes a sequential filtering module, configured to sequentially filter the corresponding sorted echo estimation signals from the M microphone signals, to generate the target signal. The N speaker signals are sorted and sequentially filtered, so that a signal that generates large distortion can be preferentially filtered, to provide the echo filtering effect.

In some embodiments, the sorting the N speaker signals includes sorting the N speaker signals based on a low frequency component of each speaker signal of the N speaker signals. The echo filtering effect can be improved by preferentially filtering a speaker signal of the low frequency component.

In some embodiments, the preprocessed signal generation module is further configured to perform the non-interleaved preprocessing on the N speaker signals and the M microphone signals to generate the at least one preprocessed signal. By using the M microphone signals as auxiliary reference signals, a frequency band with large echo may be limited, to assist in improving echo filtering.

In some embodiments, the apparatus further includes a gain adjusting module, configured to adjust a gain of at least one of the N speaker signals, the M microphone signals, and the at least one preprocessed signal, so that a gain of the echo estimation signal matches the gain of the M microphone signals. By adjusting the gain, the gain of the echo estimation signal may match the gain of the M microphone signals, thereby improving adaptive filtering effect and the echo filtering effect.

In some embodiments, the echo estimation module includes a parallel adaptive filtering module, configured to: in a case of a plurality of preprocessed signals, perform parallel adaptive filtering on the plurality of preprocessed signals to generate the at least one echo estimation signal. For the plurality of preprocessed signals with low similarity, parallel preprocessing can improve the echo filtering effect.

In some embodiments, the echo estimation module includes: a conversion module, configured to convert the at least one preprocessed signal from a time domain signal to a frequency domain signal; and a frequency domain adaptive filtering module, configured to perform the adaptive filtering on the frequency domain signal to obtain the at least one echo estimation signal. Computation overheads of the adaptive filtering may be reduced by converting the preprocessed signal from time domain to frequency domain.

In some embodiments, the apparatus includes a direct sound filtering module, configured to perform direct sound filtering on the residual signal to generate the target signal. The direct sound filtering indicates filtering an audio component directly output from the N speakers to the M microphones without environmental reflection. More specifically, the direct sound filtering indicates filtering based on a model relationship between a sound source signal played by at least one of a first speaker and a second speaker and an audio input signal directly captured by a microphone. Direct sound filtering can further improve echo filtering effect.

In some embodiments, the direct sound filtering module includes: performing default direct sound filtering, configured to perform default direct sound filtering on the target signal to generate the at least one echo estimation signal. The default direct sound filtering indicates filtering based at least on a model relationship between the sound source signal played by the N speakers and the audio input signal directly captured by the M microphones in a fully muted environment.

In some embodiments, the apparatus further includes: a display enabling module, configured to enable a display of the electronic device to display a customized direct sound filtering interface; an input receiving module, configured to receive user input of a user in the customized direct sound filtering interface; a speaker test module, configured to: in response to the user input, obtain N speaker test signals and enable the N speakers to play the N speaker test signals; a fourth obtaining module, configured to obtain M microphone test signals corresponding to the M microphones; and a storage module, configured to store a customized direct sound filtering model. The customized direct sound filtering model is obtained based on the N speaker test signals and the M microphone test signals, and the customized direct sound filtering model is used for the direct sound filtering. In some embodiments, the target signal generation module of the apparatus is further configured to perform customized direct sound filtering on the N speaker signals and the M microphone signals by using the customized direct sound filtering model to obtain the target signal. By using the customized direct sound filtering, the direct sound filtering can be optimized based on a customer's environment, and echo filtering in the customer's environment can be further improved.

In some embodiments, the apparatus further includes: a reverse audio signal generation module, configured to generate a reverse audio signal based on the N speaker signals; and a play enabling module, configured to enable a reverse speaker close to the microphone to play reverse audio based on the reverse audio signal to cancel audio output played by at least one of the N speakers. The reverse speaker is different from the first speaker and the second speaker. By enabling the reverse speaker to play the reverse audio, a part of the echo components may be filtered before the echo is captured by the microphone, thereby providing the echo filtering effect.

It should be understood that content described in the summary part is not intended to limit a key or important feature of embodiments of this disclosure, and is not intended to limit the scope of this disclosure. The following descriptions facilitate understanding of other features of this disclosure.

BRIEF DESCRIPTION OF DRAWINGS

The foregoing and other features, advantages, and aspects of embodiments of this disclosure become more obvious with reference to the accompanying drawings and with reference to the following detailed descriptions. In the accompanying drawings, same or similar reference numerals represent same or similar elements.

DESCRIPTION OF EMBODIMENTS

Figure 1:
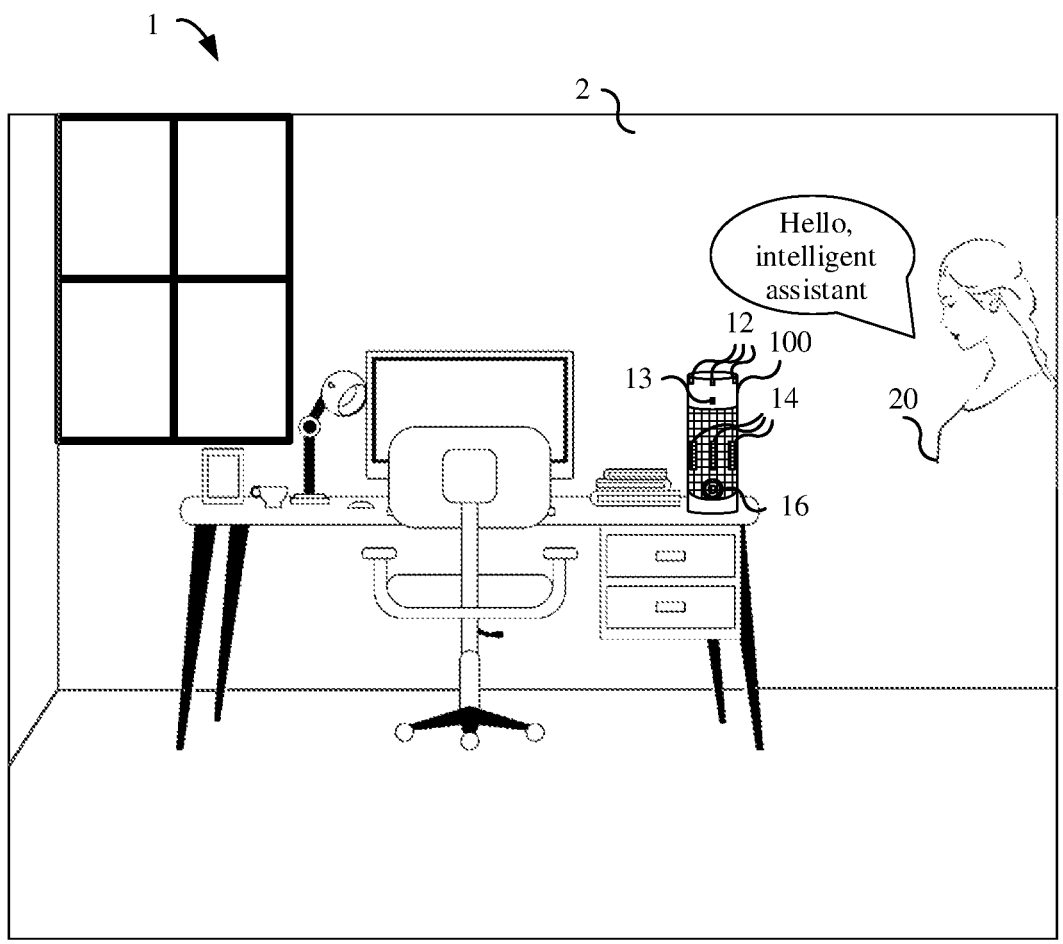
FIG. 1 shows a schematic diagram of an environment in which embodiments of this disclosure may be implemented.

The following describes embodiments of this disclosure in detail with reference to the accompanying drawings. Although some embodiments of this disclosure are shown in the accompanying drawings, it should be understood that this disclosure may be implemented in various forms, and should not be construed as being limited to the embodiments described herein. On the contrary, these embodiments are provided so that this disclosure will be thoroughly and completely understood. It should be understood that the accompanying drawings and embodiments of this disclosure are merely used as examples, but are not intended to limit the protection scope of this disclosure.

In descriptions of embodiments of the present disclosure, the term "include" and similar terms thereof should be understood as open inclusion, that is, "include but are not limited to". The term "based" should be understood as "at least partially based". The terms "one embodiment" or "the embodiment" should be understood as "at least one embodiment". The terms "first", "second", and the like may indicate different or same objects. Other explicit and implicit definitions may also be included below.

As described above, an AEC technology has been widely applied to communication electronic devices. However, an echo cancellation effect of a conventional AEC technology is still unsatisfactory in some cases, and therefore further improvement is required.

For the foregoing problem and another potential problem, embodiments of this disclosure provide an echo filtering method, an electronic device, and a computer-readable storage medium. In an embodiment of the present disclosure, direct sound filtering is performed on a plurality of microphone signals and a plurality of speakers to obtain a target signal. This can achieve better echo filtering effect. In another embodiment of the present disclosure, a reverse speaker adjacent to at least one microphone of the plurality of microphones is disposed and the reverse speaker is enabled to play reverse audio that is opposite to audio output played by the plurality of speakers, to cancel echo components of echo of audio output played by the plurality of speakers and captured by the at least one microphone. In another embodiment of the present disclosure, non-interleaved preprocessing is performed on microphone signals corresponding to a plurality of sound source signals, so that the echo components corresponding to a plurality of echoes of a plurality of sounds played by the plurality of speakers in the microphone signals can be better estimated. Better echo filtering effect is obtained by filtering the echo components. Because the estimated signal can predict continuous echo of each speaker in terms of time to some extent, by using the at least one estimated signal, the echo of the sound played by each speaker can be effectively filtered from the microphone signals captured by the microphones. In this disclosure, the foregoing three embodiments may be used separately, or may be used in any combination to obtain the better echo filtering effect.

FIG. 1 is a schematic diagram of an example environment 1 in which embodiments of this disclosure may be implemented. In an embodiment, an electronic device 100 may be, for example, a smart speaker, and may play audio, for example, music or a language program. The electronic device 100 may include N speakers located inside the electronic device, where N is an integer greater than 1. In an embodiment, the electronic device 100 includes seven speakers. A first group of speakers (commonly shown by reference numeral 14) of the seven speakers may be six medium- and high-frequency speakers disposed in a ring in the middle of the electronic device 100. Three speakers in the first group of speakers located on the front side of the electronic device 100 are shown. The other three speakers in the first group of speakers are located on the back side of the electronic device 100 and therefore are not shown. A second group of speakers 14-7 in the seven speakers may be a bass unit disposed at the bottom of the electronic device 100. For some types of audio, sound played by the first group of speakers 14 and the second group of speakers 14-7 may be different. For example, the first group of speakers 14 may mainly play medium- and high-frequency sound, and the second group of speakers 14-7 mainly play low frequency sound.

The electronic device 100 may further include a microphone group 12. The microphone group 12 may include M microphones, where M is an integer greater than 1. In an embodiment, the electronic device 100 includes, for example, six microphones located at the top (commonly shown by reference numeral 12 in the accompanying drawings). Three microphones located on the front side of the electronic device 100 are shown. The other three microphones are located on the back side of the electronic device 100 and therefore are not shown. Although the seven speakers and the six microphones are used for description in FIG. 1, this is merely an example and is not intended to limit the scope of this disclosure. In some other embodiments, the electronic device 100 may include another quantity of microphones and speakers. In addition, in some embodiments where only direct sound filtering and/or reverse speakers are used without non-interleaved preprocessing, the electronic device 100 may include only one speaker and one microphone.

Although a cylindrical configuration of the electronic device 100 is shown in FIG. 1, the electronic device 100 may also have other configurations. For example, in an embodiment, the electronic device 100 may be a strip sound box (Soundbar). Four microphones form a linear array on the top of the electronic device 100, and a plurality of speakers are also disposed horizontally linearly. For example, in another embodiment, the electronic device 100 may be a smart television. Six microphones form a linear array on the top of the smart television. A plurality of speakers surround a bottom edge, a left side edge, and a right side edge of a screen of the smart television, and a back side of the smart television.

In FIG. 1, reflected echo is generated after sound played by the first group of speakers 14 and the second group of speakers 14-7 are propagated to a wall 2. Especially, when the electronic device 100 is disposed close to the wall 2, the reflected echo is captured by a microphone group 12 of the electronic device 100. On the other hand, sound played by the first group of speakers 14 and the second group of speakers 14-7 may also be transferred to the microphone group 12 through a physical continuation surface of the electronic device 100. Therefore, an echo signal captured by the microphone group 12 includes not only a reflected echo component reflected by an environment, but also a direct sound component indicating a direct path from the first group of speakers 14 and the second group of speakers 14-7 to the microphone group 12. In this specification, the term "echo" includes the reflected echo that is captured by the microphone of the electronic device after environmental reflection of audio played by the speaker of the electronic device and direct sound that is directly captured by the microphone and that is played by the speaker of the electronic device. The term "reflected echo" indicates an audio component that an audio signal, after being output from the speaker, is reflected back to the microphone through the environment such as the wall and received by the microphone. Relatively speaking, the term "direct sound" indicates an audio component that an audio signal is directly output from the speaker to the microphone without being reflected by the environment such as the wall and is directly received by the microphone.

When the electronic device 100 plays audio and a user 20 speaks, the microphone group 12 may further capture voice of the user. In this case, M microphone signals generated by the microphone group 12 by capturing the sound each include the voice of the user, echo of audio output played by the speaker, and possible noise.

In some embodiments, the electronic device 100 may have an intelligent voice assistant and a call function. For example, the user 20 may wake up the intelligent voice assistant of the electronic device 100 by using a wakeup engine by saying a wakeup command such as "Hello, intelligent assistant". After waking up the intelligent voice assistant, the user 20 may further make a voice call by speaking voice such as "call mother". When the first group of speakers 14 and the second group of speakers 14-7 of the electronic device 100 play sound, to enable the electronic device 100 to correctly identify the wake-up command and to enable the other party in the call to hear the voice clearly without being affected by the echo, the electronic device 100 may implement the echo cancellation technology according to embodiments of this disclosure to correctly identify the voice to wake up and improve call definition. Therefore, an echo filtering effect can be further improved by using embodiments of this disclosure. In this disclosure, the terms "elimination" and "filtering" may be interchangeably used and both indicate removal of a part, while the terms "complete elimination" and "complete filtering" indicate removal of all parts.

Although a smart speaker is used in FIG. 1 to describe an application environment of embodiments of this disclosure, it may be understood that this is merely an example rather than a limitation on the scope of this disclosure. Embodiments of this disclosure may also be implemented in another electronic device having a speaker and a microphone. For example, the electronic device that may implement embodiments of this disclosure may include at least one of the following: a smart speaker, a set-top box, an entertainment unit, a navigation device, a communication device, a fixed location data unit, a mobile location data unit, a mobile phone, a cellular phone, a tablet computer, a computer, a portable computer, a desktop computer, a personal digital assistant (PDA), a monitor, a television, a tuner, a radio, a satellite radio, a music player, a digital music player, a portable music player, a digital video player, a video player, a digital video disc (DVD) player, a portable digital video player, and the like.

Figure 2:
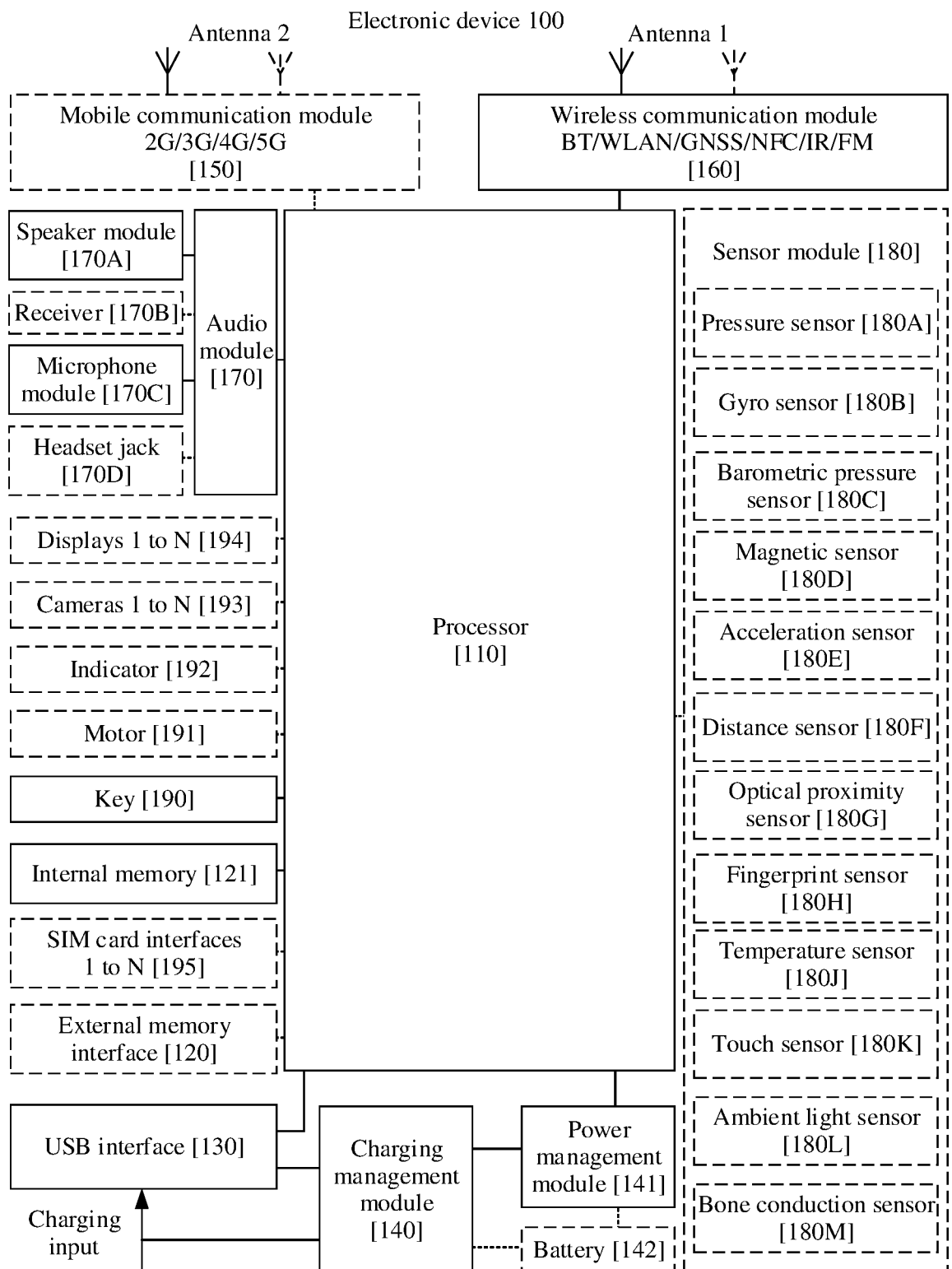
FIG. 2 is a schematic block diagram of an electronic device according to an embodiment of the present disclosure.

FIG. 2 is a schematic block diagram of an electronic device 100 according to an embodiment of the present disclosure. It should be understood that the electronic device 100 shown in FIG. 2 is merely an example, and should not constitute any limitation on an implemented function and scope described in this disclosure. In an embodiment, the electronic device 100 may include a processor 110, a wireless communication module 160, an antenna 1, an audio module 170, a speaker module 170A, a microphone module 170C, a key 190, an internal memory 121, a universal serial bus (USB) interface 130, a charging management module 140, and a power management module 141 that are shown in a solid box and a solid line. The microphone module 170C may include, for example, the M microphones described above. The speaker module 170A may include the N speakers described above, for example, the first group of speakers 14 and the second group of speakers 14-7. In some other embodiments, the speaker module 170A may further include a reverse speaker group having at least one reverse speaker. The reverse speaker is configured to play reverse audio used to cancel an echo component to be picked up by a microphone.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). In some embodiments, different processing units may be independent devices. In some other embodiments, different processing units may alternatively be integrated into one or more processors. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

The internal memory 121 may be configured to store computer-executable program code. The executable program code includes instructions. The internal memory 121 may include a program storage area and a data storage area. The program storage area may store an operating system, an application program required by at least one function (for example, an echo filtering function, a sound playing function, or an image play function in embodiments of this disclosure), and the like. The data storage area may store data (for example, audio data or an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS). The processor 110 runs instructions stored in the internal memory 121 and/or instructions stored in the memory disposed in the processor, to perform various function applications and data processing of the electronic device 100.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the charging management module 140, the processor 110, and optionally, the optional battery 142. The power management module 141 receives input of the battery 142 and/or the charging management module 140, and supplies power to the processor 110, the internal memory 121, the wireless communication module 160, and the like. In an embodiment with the battery 142, the power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

The electronic device 100 may use the audio module 170, the speaker module 170A, the microphone module 170C, the application processor, and the like, to implement an audio function. For example the audio function includes music playing, recording, and the like. The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker module 170A, also referred to as a "loudspeaker", includes, for example, N speakers and optionally a reverse speaker (for example, M reverse speakers), and is configured to convert an audio electrical signal into a sound signal. The electronic device 100 may be used to listen to music or answer a call in a hands-free mode over the speaker module 170A.

The microphone module 170C, also referred to as a "microphone", or a "mic", includes, for example, M microphones and is configured to convert the sound signal into an electrical signal. When making a call or sending a voice message, a user may make a sound near the microphone module 170C through the mouth of the user, to input a sound signal to the microphone module 170C. In the disclosed embodiment, the electronic device 100 uses an echo filtering function to reduce an echo component that is in the sound picked up by the microphone module 170C and that is related to the sound played by the speaker module 170A, thereby improving accuracy of waking up the intelligent assistant and/or improving voice call quality. In some other embodiments, the electronic device 100 may further identify a sound source, implement a directional recording function, and the like.

A wireless communication function of the electronic device 100 may be implemented through the antenna 1, the wireless communication module 160, the modem processor, the baseband processor, and the like. The antenna 1 is configured to transmit and receive an electromagnetic wave signal. Each antenna in the electronic device 100 may be configured to cover one or more communication frequency bands. Different antennas may be further multiplexed, to improve antenna utilization.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communication module 160 may be one or more components integrating at least one communication processor module. The wireless communication module 160 receives an electromagnetic wave by the antenna 1, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 1.

In some other embodiments, the electronic device 100 may further include an antenna 2 and a mobile communication module 150. The antenna 2 is configured to transmit and receive an electromagnetic wave signal. Each antenna in the electronic device 100 may be configured to cover one or more communication frequency bands. Different antennas may be further multiplexed, to improve antenna utilization. For example, the antenna 2 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 2, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 2. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker module 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

In some embodiments, the antenna 2 and the mobile communication module 150 in the electronic device 100 are coupled, and the antenna 1 and the wireless communication module 160 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidounavigation satellite system (BDS), a quasi-zenith satellite system (QZSS), and/or a satellite based augmentation system (SBAS).

The key 190 includes a power button, a volume button, and the like. The key 190 may be a mechanical button, or may be a touch button. The electronic device 100 may receive a key input, and generate a key signal input related to a user setting and function control of the electronic device 100.

In some other embodiments, in addition to the foregoing components, the electronic device 100 may further include one or more of an external memory interface 120, a battery 142, a receiver 170B, a headset jack 170D, a sensor module 180, a motor 191, an indicator 192, a camera 193, a display 194, and a subscriber identity module (SIM) card interface 195 shown in dashed lines and dashed boxes. The sensor module 180 may include one or more of a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M. The sensor module 180 may further include another type of sensor that is not listed.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

In some embodiments, the electronic device 100 further includes the receiver 170B and the headset jack 170D. The receiver 170B, also referred to as an "earpiece", is configured to convert an electrical audio signal into a sound signal. When a call is answered or speech information is received through the electronic device 100, the receiver 170B may be put close to a human ear to listen to a voice. The headset jack 170D is configured to connect to a wired headset. The headset jack 170D may be the USB interface 130, or may be a 3.5 mm open mobile terminal platform (OMTP) standard interface or a cellular telecommunication industry association of the USA (CTIA) standard interface.

The electronic device 100 can implement a photographing function by using the ISP, the camera 193, the video codec, the GPU, the display 194, the application processor, and the like. The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (MPEG) 1, MPEG2, MPEG3, and MPEG4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect magnitudes of accelerations of the electronic device 100 in various directions (usually on three axes), and When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED), and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the captured fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The motor 191 may generate a vibration prompt. The motor 191 may be configured to provide an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

In addition, it may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

Figure 3:
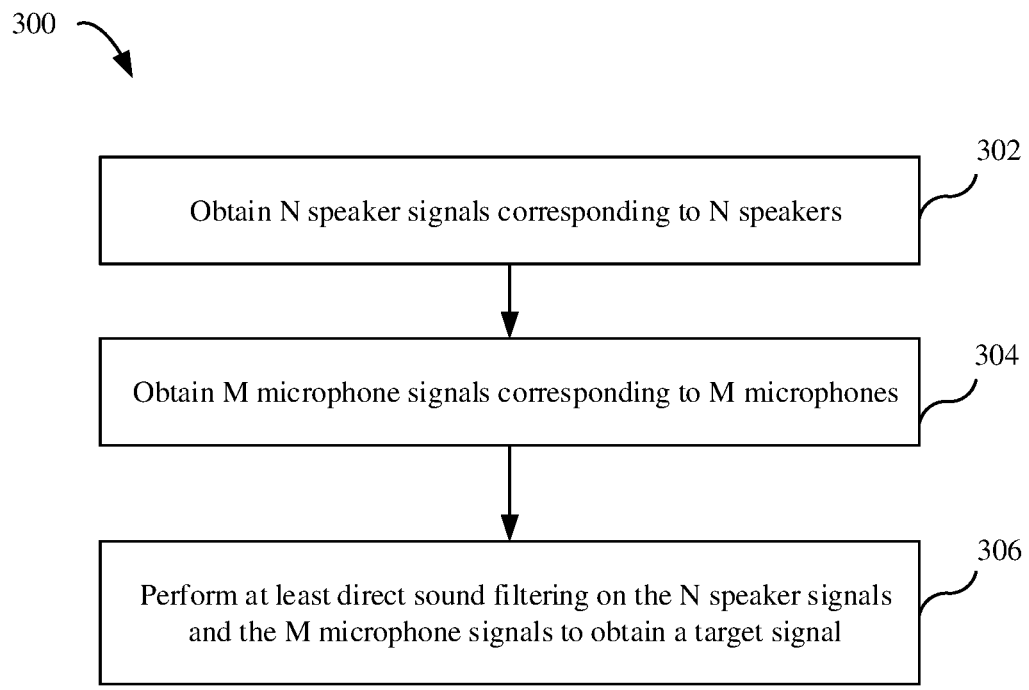
FIG. 3 is a schematic flowchart of an echo filtering method according to an embodiment of the present disclosure.

FIG. 3 is a schematic flowchart of an echo filtering method 300 according to an embodiment of the present disclosure. In some cases, a plurality of microphone signals may be generated according to sound effect algorithms such as a virtual sound field, upmixing, and sound field extension. Some sound effect algorithms enable strong correlation between microphone signals, which poses a great challenge to adaptive filtering. In an embodiment, direct sound processing may model acoustic transfer function coefficients from each speaker to each microphone in advance. In a filtering process, these pre-estimated models are used for filtering, and the pre-estimated models are used as subsequent processing of the adaptive filtering, so that filtering effect of the adaptive filtering can be improved.

In an embodiment, the method 300 may be performed by a processor 110 of an electronic device 100. The electronic device 100 includes M microphones and N speakers. M and N are integers greater than 1. Although it is shown that the processor 110 performs the method 300, this is merely an example and is not limited to the scope of this disclosure. One or more operations in the method 300 may be performed by another computing device, such as a digital signal processor (DSP), other than the processor 110.

At 302, the processor 110 obtains N speaker signals corresponding to the N speakers. In an embodiment, the N speaker signals are copies of N audio signals played by the N speakers. In this disclosure, the term "copy" refers to a copied signal that has a one-to-one correspondence with a source signal in terms of audio content. In an embodiment, the N speaker signals may be the same as the N audio signals played by the speaker. In another embodiment, the N speaker signals may not be completely the same as the N audio signals played by the speaker, but can reflect audio content of the N audio signals. For example, content of the N speaker signals is substantially the same as that of the N audio signals, but a gain of the N speaker signals is different from a gain of the N audio signals.

At 304, the processor 110 obtains M microphone signals corresponding to the M microphones. As described above, each of the M microphone signals includes voice of a user, echo of audio output played by the N speakers, and possible noise. In an embodiment, the processor 110 may sequentially process the M microphone signals. Alternatively, if the processor 110 includes a plurality of processing cores, the plurality of processing cores may separately process the M microphone signals to improve a processing speed. It may be understood that, if the speaker plays audio, each of the M microphone signals includes a target audio signal component, N echo signal components of the N speakers, and a noise signal component.

At 306, the processor 110 performs at least direct sound filtering on the N speaker signals and the M microphone signals to obtain a target signal. In some embodiments, the target signal is used by a wakeup engine to wake up an intelligent voice assistant or is transmitted to another electronic device for a voice call. In some embodiments, the target signal includes fewer echo components than the M microphone signals. The echo components are used to represent echo of sound propagated in space that is of the N speaker signals and that is captured by the M microphones.

There is a physical direct sound propagation path from each of the N speakers to each of the M microphones without environmental reflection. A filtering coefficient of a direct sound filtering model is fixed and does not need to be updated during filtering, because the direct sound propagation path from the speaker to the microphone is usually fixed. Therefore, the direct sound filtering model can be established accordingly. In some embodiments, by using direct sound filtering model for an N×M direct propagation path function from the N speakers to the M microphones, a direct sound component of the N speakers may be filtered from the M microphone signals, thereby achieving better echo filtering effect, and therefore improving a success rate of wakeup of the wakeup engine and/or improving quality of a voice call.

In some embodiments, the direct sound filtering includes default direct sound filtering. The default direct sound filtering indicates filtering based at least on a model relationship between N speaker signals played by the N speakers and M microphone signals directly captured by the M microphones in a fully muted environment. In an embodiment, in a full anechoic chamber without any reflected echo, the processor 110 of the electronic device 100 controls the N speakers of a product to separately play white noise or music sound sources, and uses all the M microphones to record separately. M and N represent positive integers greater than 1, and may be the same or different. The electronic device sequentially filters a plurality of recordings by using the adaptive filtering, and stores M×N groups of filter coefficients indicating transfer functions from the N speakers to the M microphones respectively as a default direct sound filtering model. The default direct sound filtering model is stored in the electronic device before delivery or is stored in the electronic device in a firmware update manner of the electronic device, so that the user can use the default direct sound filtering model when performing direct sound filtering.

In another embodiment, the direct sound filtering may further include customized direct sound filtering. The user can customize a direct sound cancellation model based on a daily environment to obtain a better direct sound filtering effect. For example, the electronic device 100 may display a customized direct sound filtering interface on the display 194. The user 20 may click and input a customized virtual key in the customized direct sound filtering interface, for example, in a touch manner. After receiving user input, the processor 110 obtains N test signals for the N speakers from the internal memory 121, and enables the N speakers to play the N speaker test signals and perform recording by using all the M microphones. The processor 110 further obtains M microphone test signals corresponding to the M microphones, generates, based on the N speaker test signals and the M microphone test signals, a customized direct sound filtering model for customizing direct sound filtering, and stores the customized direct sound filtering model in the internal memory 121. The customized direct sound filtering model is used for the foregoing direct sound filtering.

When subsequently playing audio, the user 20 may select default direct sound filtering or customized direct sound filtering in a direct filtering selection interface displayed on the display 194. When the user 20 chooses the customize direct sound filtering, the electronic device 100 filters the M microphone signals by using the stored customized direct sound filtering model. It may be understood that, in some embodiments, the direct filtering selection interface and the customized direct sound filtering interface may be different options displayed in different display areas of a same interface.

In some embodiments, the customized direct sound filtering interface displays an indicator for indicating to keep an environment quiet. The customized direct sound filtering interface may further display a decibel indicator indicating environmental noise and/or an indicator indicating whether customized echo filtering is suitable. For example, if the electronic device 100 includes a sensor configured to measure environmental noise, current environmental noise may be displayed in real time in the customized direct filtering interface, and a direct sound test is performed only when the current environmental noise is lower than a threshold. By displaying the indicator for indicating to keep the environment quiet, the decibel indicator, and/or the indicator indicating whether customized echo filtering is suitable, the user can establish a customized direct sound filtering model in a quiet and suitable environment. This lays a good basis for subsequent customized direct sound filtering specific to the environment, and subsequently obtains good echo filtering effect in the environment.

In some embodiments in which the electronic device 100 does not have a display, the electronic device 100 may play voice to guide the user to remain quiet in a use environment and start customization. The processor 110 of the electronic device 100 enables the N speakers to separately play white noise or music sound sources, and uses all the M microphones to perform recording.

In addition, the electronic device 100 may have a plurality of customized direct sound filtering options to customize corresponding direct sound filtering for different environments. When the electronic device 100 is in different environments, the user 20 may select a direct sound filtering model for the environment on the direct sound filtering selection interface. In addition, when the electronic device 100 reaches a new environment, a direct sound filtering model for the new environment may be re-customized, and the new direct sound filtering model for the new environment is stored in the internal memory 121 for subsequent use.

Although an example in which the electronic device 100 has the M microphones and the N speakers is used for description in FIG. 3, this is merely an example and does not limit the scope of this disclosure. The method 300 may also be applied to an electronic device of another quantity. For example, the method 300 may also be applied to an electronic device having a plurality of speakers and a single microphone, a plurality of microphones and a single speaker, or a single microphone and a single speaker.

Figure 4:
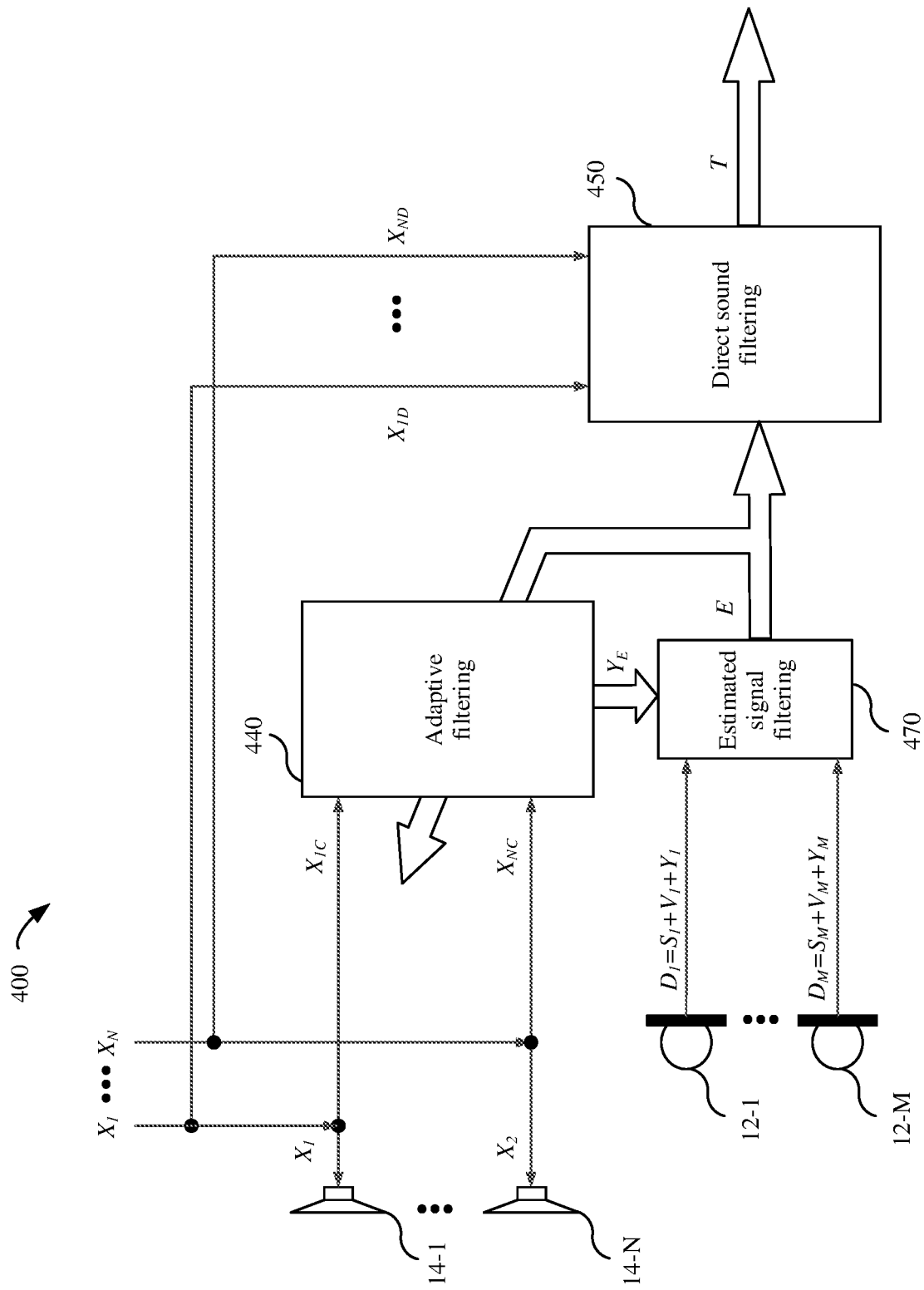
FIG. 4 is a schematic diagram of a process of direct sound filtering according to an embodiment.

FIG. 4 is a schematic diagram of a process 400 of direct sound filtering according to an embodiment. N sound source signals $X_1 \ldots X_N$ are respectively output to N speakers 14-1 . . . 14-N, while N speaker signals $X_{1C} \ldots X_{NC}$ as copies of the N sound source signals $X_1 \ldots X_N$ are provided to the processor 110 for adaptive filtering 440. Another group of copies $X_{1D} \ldots X_{ND}$ of the sound source signals $X_1 \ldots X_N$ are used for direct sound filtering 450. An audio source is, for example, audio data stored in a storage device in a server that communicates by using the Internet, audio data stored in a local storage device, or audio data captured by a microphone of another device.

Although the N speaker signals $X_{1C} \ldots X_{NC}$ are shown as being directly adaptively filtered, this is merely an example and is not intended to limit the scope of the disclosure. It is understood that the N speaker signals $X_{1C} \ldots X_{NC}$ may undergo various adjustments and processing, such as gain scaling and non-interleaved preprocessing as described below. Adjusted and preprocessed signals are provided for adaptive filtering. In some other embodiments, a signal provided to the speaker and a microphone signal for adaptive filtering may be different (for example, different gains), but have correlation so that the microphone signal can indicate sound played by the speaker.

The processor 110 performs adaptive filtering 440 on the N speaker signals $X_{1C} \ldots X_{NC}$ to generate M echo estimation signals $Y_E$. In an embodiment, the adaptive filtering 440 includes, for example, least mean square error (LMS) filtering, recursive least squares (RLS) filtering, and the like. In an embodiment, the adaptive filtering converts a preprocessed signal from a time domain signal to a frequency domain signal, and then performs adaptive filtering processing on the frequency domain signal. For example, for a time domain signal with a sampling rate of 16 kHz, an overlap length of 75% and Fourier transform of 1024 points may be used to convert the time domain signal into a frequency domain signal. Certainly, Fourier transform of other overlapping lengths and other points may also be used. When a higher proportion of overlapping lengths are used, continuity of previous and next audio frames can be improved, but computation overheads is increased. In a case of Fourier transform with a higher number of points, spectral resolution can be improved to improve an adaptive result, but this also increases the computation overhead. For a time domain signal with a sampling rate of 16 kHz, an overlap length of 75% and Fourier transform of 1024 points can achieve a better balance between filtering effect and the computation overhead.

M microphones 12-1 . . . 12-M respectively collect various sound, which respectively include a voice of the user 20, audio echo of audio played by the N speakers 14-1 . . . 14-N, and possible noise. In an embodiment, a microphone signal D captured by each of the M microphones 12-1 . . . 12-M includes a voice signal component S, a noise signal component V, and an echo signal component Y The echo signal component Y includes a reflected echo signal component and a direct sound signal component. Therefore, the microphone signal D is a composite signal of the voice signal component S, the noise signal component V, and the echo signal component Y As shown in FIG. 4, a first microphone signal may be represented by a formula $D_1=S_1+V_1+Y_1$. An $M^{th}$ microphone signal may be represented by a formula $D_M=S_M+V_M+Y_M$.

The M echo estimation signals $Y_E$ respectively correspond to microphone signals $D_1 \ldots D_M$ captured by the M microphones. For example, a first echo estimation signal in the M echo estimation signals $Y_E$ corresponds to the first microphone signal $D_1$. An $M^{th}$ echo estimation signal in the M echo estimation signals $Y_E$ corresponds to the $M^{th}$ microphone signal $D_M$.

The processor 110 filters M echo estimation signals from the M microphone signals respectively to generate M residual signals E. For example, the first echo estimation signal is filtered from the first microphone signal $D_1$ to obtain a first residual signal. The $M^{th}$ echo estimation signal is filtered from the $M^{th}$ microphone signal $D_M$ to obtain an $M^{th}$ residual signal. The M residual signals E may be further used to update the adaptive filtering 440 to improve accuracy of echo estimation. For example, the first residual signal is used to update adaptive filtering corresponding to the first echo estimation signal. The $M^{th}$ residual signal is used to update adaptive filtering corresponding to the $M^{th}$ echo estimation signal.

The processor 110 may then perform direct sound filtering 450 on the M residual signals E separately by using the default direct sound filtering model or the customized direct sound filtering model described above, to generate M target signals T. For example, the direct sound filtering 450 is performed on the first residual signal to generate a first target signal. The direct sound filtering 450 is performed on the $M^{th}$ residual signal to generate an $M^{th}$ target signal. In an embodiment, the M target signals T are then used by a wakeup engine to wake up an intelligent assistant or transmitted to a call receiver over a network. In another embodiment, the M target signals T may then be further filtered by using a conventional solution such as a non-linear filtering solution or a machine learning solution to obtain better echo filtering effect, and then used by the wakeup engine to wake up the intelligent assistant or transmitted to the call receiver over the network.

Figure 5:
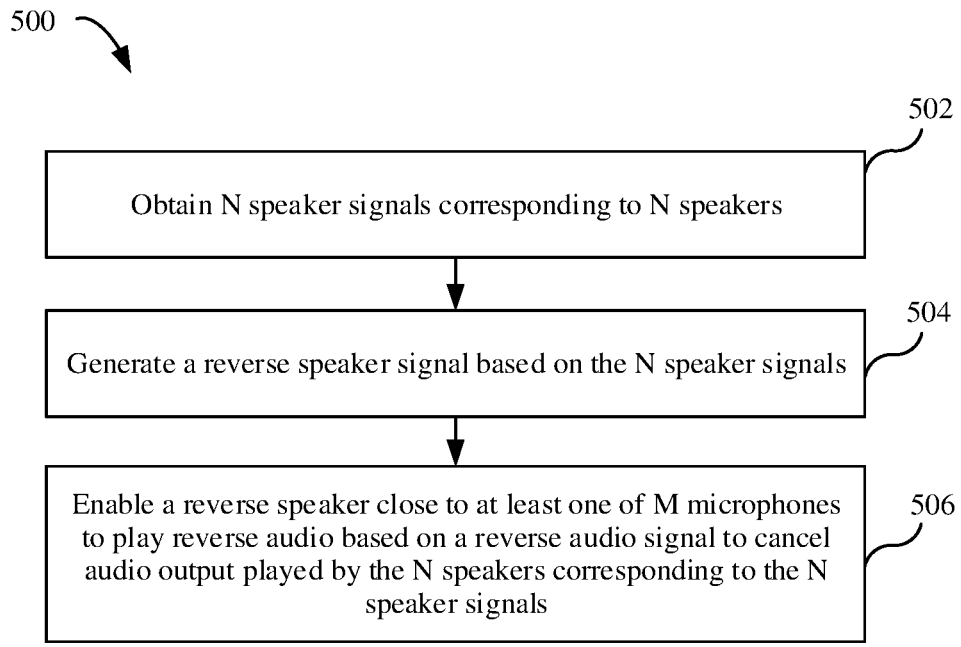
FIG. 5 is a schematic flowchart of an echo filtering method according to another embodiment of the present disclosure.

FIG. 5 is a schematic flowchart of an echo filtering method 500 according to another embodiment of the present disclosure. An electronic device 100 includes N speakers 14-1 . . . 14-N, M microphones 12-1 . . . 12-M, and a processor 110. In addition, the electronic device 100 may have at least one reverse speaker disposed near at least one microphone in a microphone group 12. For example, for the M microphones, the electronic device 100 may have M reverse speakers respectively corresponding to the M microphones. In another embodiment, when the microphones are close to each other, a reverse speaker for two adjacent microphones may be disposed between the microphones to save space and costs. In other words, the electronic device 100 may have fewer reverse speakers than the M microphones.

In an embodiment, the reverse speaker may be set to be 10 cm, 5 cm, 1 cm, or closer to the microphone group 12 to play reverse audio, thereby canceling echo of audio played by the N speakers. In this specification, the term "reverse audio" represents audio used to cancel the echo of the audio played by the N speakers. The term "reverse speaker" represents a speaker disposed near a microphone and configured to play the reverse audio. Compared with the previously described method 300 and the subsequently described method 700, which perform echo filtering by using internal echo algorithm estimation, the method 500 cancels echo by playing the reverse audio externally. This can reduce an echo component in a microphone signal to obtain an echo filtering effect.

In an embodiment, the method 500 may be performed by the processor 110 of the electronic device 100. The processor 110 of the electronic device 100 may receive, by using a communication unit, audio signals to be played by a plurality of speakers, and transmit the audio signals to the plurality of speakers for playing. Alternatively, the processor 110 may receive, from a storage unit, a ROM, or a RAM, audio to be played by the plurality of speakers and transmit the audio to the plurality of speakers for playing. Although it is shown that the processor 110 performs the method 500, this is merely an example and is not limited to the scope of this disclosure. One or more operations in the method 500 may be performed by another computing device, such as a digital signal processor (DSP), other than the processor 110.

At 502, the processor 110 obtains N speaker signals corresponding to the N speakers. In an embodiment, the N speaker signals are copies of N audio signals played by the N speakers.

At 504, the processor 110 generates a reverse speaker signal based on the N speaker signals. In an embodiment, a direct sound impulse response model from each speaker to a microphone may be tested in a fully muted environment, and then a reverse filtering model is designed based on the direct sound impulse response model. Similar to a default direct sound filtering model, the reverse filtering model may be stored in the electronic device before the electronic device is delivered from a factory or in a firmware update manner of the electronic device, to subsequently perform reverse echo filtering. Similarly, users can customize the reverse filtering model in their own environments. The electronic device controls volume played by the reverse speaker and a sound-making frequency band, so that the reverse audio works only at the microphone and a target frequency band, and finally the microphone receives less echo, thereby improving echo filtering performance.

At 506, the processor 110 enables at least one reverse speaker close to at least one of the M microphones to play the reverse audio based on a reverse audio signal to cancel echo of audio output of the N speakers. By enabling the reverse speaker to play the reverse audio, a part of the echo components may be filtered before the echo is captured by the microphone, thereby providing the echo filtering effect. It may be understood that the method 500 may be independently used to perform echo filtering, or may be combined with at least one of the method 300 and the method 700 to obtain better echo filtering effect.

Although an example in which the electronic device 100 has the M microphones and the N speakers is used for description in FIG. 5, this is merely an example and does not limit the scope of this disclosure. The method 500 may also be applied to an electronic device of another quantity. For example, the method 500 may also be applied to an electronic device having a plurality of speakers and a single microphone, a plurality of microphones and a single speaker, and a single microphone and a single speaker.

Figure 6:
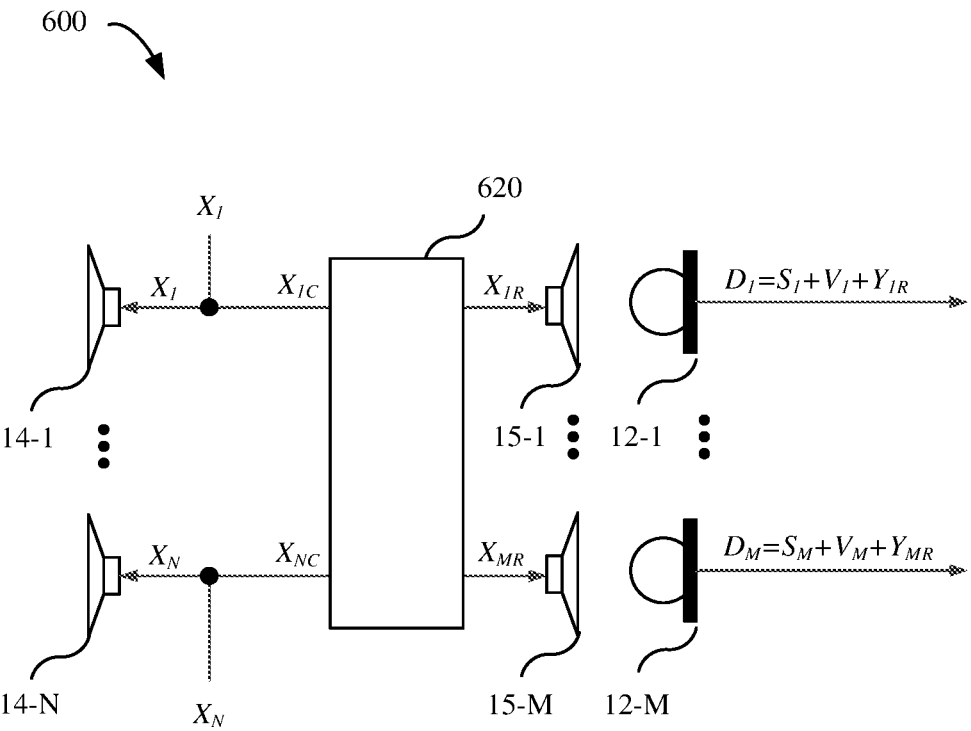
FIG. 6 is a schematic diagram of a reverse echo cancellation process according to an embodiment.

FIG. 6 is a schematic diagram of a reverse echo cancellation process 600 according to an embodiment. M reverse speakers 15-1 . . . 15-M are respectively disposed near the M microphones 12-1 . . . 12-M to play echo components in sound to be captured by the microphones. N sound source signals $X_1 \ldots X_N$ from sound sources are output to the N speakers 14-1 . . . 14-N by a processor 110. An audio source is, for example, audio data stored in a storage device in a server that communicates by using the Internet, audio data stored in a local storage device, or audio data captured by a microphone of another device.

As copies of the N sound source signals $X_1 \ldots X_N$, N speaker signals $X_{1C} \ldots X_{NC}$ are reversely processed 620 by the processor 110 to generate M reverse audio signals $X_{1R} \ldots X_{MR}$. The processor 110 enables the M reverse speakers 15-1 . . . 15-M to play the M reverse audio signals $X_{1R} \ldots X_{MR}$ respectively. The first reverse audio signal $X_{1R}$ cancels echo of audio played by the N speakers 14-1 . . . 14-N outside the first microphone 12-1, so that a microphone signal $D_1$ captured by the first microphone 12-1 includes a voice signal $S_1$, noise $V_1$, and a remaining echo signal component $Y_{1R}$ that is not completely filtered. By analogy, an $M^{th}$ reverse audio signal $X_{MR}$ cancels the echo of the audio played by the N speakers 14-1 . . . 14-N outside the $M^{th}$ microphone 12-M, so that a microphone signal $D_M$ captured by the $M^{th}$ microphone 12-M includes a voice signal $S_M$, noise $V_M$, and a remaining echo signal component $Y_{MR}$ that is not completely filtered. In an embodiment, the microphone signal may be further echo filtered by at least one of the method 300 and the method 700. In another embodiment, the microphone signal may be used as a target signal to wake up an intelligent assistant by a wakeup engine or transmitted to a call receiver by using a network, or further filtered by using a conventional solution such as a non-linear filtering solution or a machine learning solution to obtain better echo filtering effect, and then used to wake up the intelligent assistant by the wakeup engine or transmitted to the call receiver by using the network.

Figure 7:
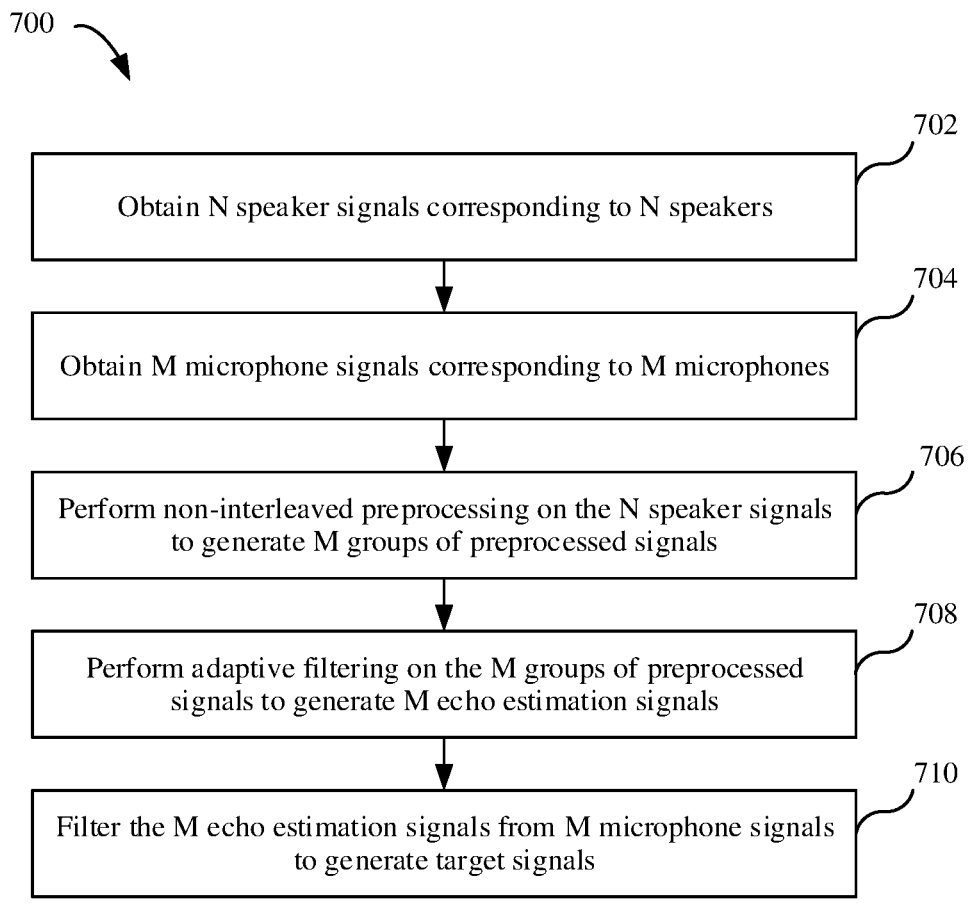
FIG. 7 is a schematic flowchart of an echo filtering method according to still another embodiment of the present disclosure.

FIG. 7 is a schematic flowchart of an echo filtering method 700 according to still another embodiment of the present disclosure. An electronic device 100 includes M microphones and N speakers. M and N are integers greater than 1. Although it is shown that a processor 110 performs the method 700, this is merely an example and is not limited to the scope of this disclosure. One or more operations in the method 700 may be performed by another computing device, such as a digital signal processor (DSP), other than the processor 110.

At 702, the processor 110 obtains N speaker signals corresponding to the N speakers. In an embodiment, the N speaker signals are copies of N audio signals played by the N speakers.

At 704, the processor 110 obtains M microphone signals corresponding to the M microphones. As described above, each of the M microphone signals includes voice of a user, echo of audio output played by the N speakers, and possible noise. In an embodiment, the processor 110 may sequentially process the M microphone signals. Alternatively, if the processor 110 includes a plurality of processing cores, the plurality of processing cores may separately process the M microphone signals to improve a processing speed. It may be understood that, if the speaker plays audio, each of the M microphone signals includes a target audio signal component, N echo signal components of the N speakers, and a noise signal component.

At 706, the processor 110 performs non-interleaved preprocessing on the N speaker signals to generate M groups of preprocessed signals. Each group of preprocessed signals includes at least one non-interleaved preprocessed signal. In this specification, "non-interleaved preprocessing" indicates that a plurality of audio frames corresponding to a same time slot of a plurality of speaker signals are preprocessed simultaneously in a combined manner or that the plurality of speaker signals are preprocessed sequentially and adaptive filtering is updated by using a target signal corresponding to a single speaker signal. Therefore, a preprocessed signal corresponding to the time slot can reflect at least a portion of audio characteristics of each speaker signal of the plurality of speaker signals. In other words, "non-interleaved preprocessing" includes processing the plurality of speaker signals in other ways than performing interleaved preprocessing on the plurality of speaker signals in a unit time period or frame as described above, to continuously indicate a condition of the plurality of speaker signals at the same time in time, without alternately using a plurality of audio frames from the plurality of speaker signals for interleaved preprocessing or splicing. In any time slot, the preprocessed signal that has undergone non-interleaved preprocessing is associated with each speaker signal of the plurality of speaker signals at any time of a preprocessed audio stream. The non-interleaved preprocessing includes, for example, linear summation, linear difference, reference audio signal sorting, serial/parallel filtering manner adjustment, gain adjustment, microphone signal-based filtering, and the like.

In an embodiment, the processor 110 may perform linear summation on at least two speaker signals of the N speaker signals. For example, the processor performs linear summation on the N speaker signals by time, thereby synthesizing the N speaker signals into a single audio signal. In this way, subsequent filtering of the processor needs to be performed only for a single combined audio signal, thereby reducing a subsequent computation operation overhead. In contrast, a conventional interleaving manner is to sequentially select audio segments of a unit time length from different reference audio signals according to a predetermined unit time length, and interleave the audio segments into a single reference audio signal. For example, a single reference audio signal includes a first audio segment selected from a first unit time period of a first reference audio signal, a second audio segment selected from a first unit time period of a second reference audio signal, a third audio segment selected from a second unit time period of the first reference audio signal, and so on. Therefore, computation overheads of the conventional interleaving manner may be N times that of a linear summation operation manner. By synthesizing the N speaker signals into the single audio signal, a computational amount of audio signal processing can be significantly reduced.

In another embodiment, the processor 110 may perform linear difference on at least two speaker signals of two speaker signals of the N speaker signals. For example, the processor 110 performs linear difference on a first speaker signal and a second speaker signal by time, to synthesize the two audio signals into a single audio signal. In this way, subsequent filtering of the processor 110 needs to be performed only for a single combined audio signal, rather than for the two speaker signals, thereby reducing a subsequent computation operation overhead. In addition, in some cases, echo filtering focuses on the difference between output of a frequency band or different speakers. In this case, a difference signal may be separately provided to the processor 110 or combined with another speaker signal to further improve an echo filtering effect.

In another embodiment, the processor 110 may sort the N speaker signals to adjust a sort of echo filtering. For example, the processor may preferentially filter an echo component for the second speaker signal from the microphone signal, and then filter an echo component for the first speaker signal from the filtered audio signal. In some cases, it is beneficial to sort different speaker signals and perform echo filtering according to a sorting result. For example, if the second speaker signal is low-frequency audio output by a subwoofer speaker, first filtering a low-frequency audio component significantly improves the echo filtering effect.

In another embodiment, when at least one preprocessed signal includes a plurality of signals among a summation signal, the difference signal, and the speaker signal, the plurality of signals may be sorted according to the echo filtering effect. For example, a signal that may generate large distortion may be used as a priority sorting signal for preferentially performing subsequent adaptive filtering. In an embodiment, a signal of distortion includes a signal with a higher low frequency content may be generated. The research shows that the filtering effect can be improved significantly by filtering a low frequency signal first. Therefore, by changing a filtering sorting, a distortion degree in speech recognition and a call process can be reduced.

In addition to the foregoing description that the plurality of preprocessed signals are adaptively processed in sequence and serially, the plurality of preprocessed signals may be further combined into a matrix signal to perform adaptive processing in parallel. For example, L preprocessed signals may be combined into an L-dimensional matrix for parallel adaptive filtering. L is an integer greater than 1. Whether to perform serial adaptive filtering or parallel adaptive filtering on the plurality of preprocessed signals may be selected based on a similarity between the plurality of speaker signals or preprocessed signals. In an embodiment, the similarity between the plurality of speaker signals is high, for example, the electronic device 100 plays mono audio. In other words, the N speakers play the same audio. In this case, serial adaptive filtering may be performed based on the N speaker signals associated with the N speakers to obtain a better filtering effect and better protect voice input of a microphone group 12. In another embodiment, the similarity between the plurality of speaker signals is low, for example, the electronic device 100 plays stereo or 5.1 surround sound audio. In this case, the N speaker signals indicating each channel may be combined into a matrix to perform parallel adaptive filtering, to obtain a better filtering effect.

In still another embodiment, the processor 110 may adjust a gain of the N speaker signals, so that a gain of an echo estimation signal matches a gain of the microphone signal, to better filter the echo. A microphone signal actually received by the microphone is affected by factors including an analog-to-digital conversion gain of the microphone 12. Therefore, if the gain of the microphone signal captured by the microphone 12 does not match the gain of the echo estimation signal, for example, the gain of the echo estimation signal is far lower than the gain of the microphone signal, a filter may fail to converge to a better state. Further, the target signal still includes a high echo signal. Correspondingly, the intelligent assistant of the electronic device may not be activated, and/or the other party during the call may still hear a large quantity of echo.

In an embodiment, the gain may be adjusted based on an acoustic characteristic of the electronic device 100. For example, during the design and manufacture of the electronic device 100, a default gain adjustment setting is obtained by testing an echo gain picked up or received by the microphone and adjusting the gain of the N speaker signals or preprocessed signals based on a final echo filtering effect in the case that only echo exists. Therefore, by adjusting the gain of the N speaker signals or the preprocessed signals, the gain of the echo estimation signal may match or be equivalent to the gain of the microphone signal, thereby filtering the echo from the microphone signal more effectively.

Alternatively, a gain of the combined signal of the N speaker signals may also be adjusted so that the gain of the echo estimation signal matches the gain of the microphone signal. It may be understood that gain adjustment may be performed at any operation before the last operation of echo filtering is performed to implement gain matching, thereby obtaining better echo filtering effect. In addition, it may be further understood that an amplitude of gain adjustment performed at each stage may be related to a specific operation, and adjustment of a same amplitude does not need to be performed.

In still another embodiment, the M microphone signals captured by the microphone group 12 may be used as reference signals for non-interleaved preprocessing. For example, each microphone in the M microphone signals may perform summation, difference, sorting, gain adjustment, and the like with the N speaker signals. In addition, band-pass filtering (for example, low-pass filtering) may be further performed on the microphone signal, to filter a frequency band with a large residual echo and improve an echo filtering effect.

It may be understood that in some embodiments of the present disclosure, different non-interleaved preprocessing may be performed on different speaker signals. For example, in the case of N being 7, summation may be performed for a first speaker signal and a second speaker signal. Difference may be performed on a third speaker signal and a fourth speaker signal. Gain adjustment may be performed on a fifth speaker signal and a sixth speaker signal. A summation signal, a difference signal, a gain-adjusted fifth speaker signal, the sixth speaker signal, and a seventh speaker signal are sorted to generate five sorted preprocessed signals.

At 708, the processor 110 performs adaptive filtering on the M groups of preprocessed signals to generate M echo estimation signals. The M echo estimation signals represent echo signal components of the M microphone signals estimated based on the speaker signal. Adaptive filtering includes, for example, LMS filtering and RLS filtering. In an embodiment, the adaptive filtering converts a preprocessed signal from a time domain signal to a frequency domain signal, and then performs adaptive filtering processing on the frequency domain signal. For example, for a time domain signal with a sampling rate of 16 kHz, an overlap length of 75% and Fourier transform of 1024 points may be used to convert the time domain signal into a frequency domain signal. Certainly, Fourier transform of other overlapping lengths and other points may also be used. When a higher proportion of overlapping lengths are used, continuity of previous and next audio frames can be improved, but computation overheads is increased. In a case of Fourier transform with a higher number of points, spectral resolution can be improved to improve an adaptive result, but this also increases the computation overhead. For a time domain signal with a sampling rate of 16 kHz, an overlap length of 75% and Fourier transform of 1024 points can achieve a better balance between filtering effect and the computation overhead.

At 710, the processor 110 filters the M echo estimation signals from the M microphone signals respectively to generate M target signals. In this embodiment, the target signal is a residual signal. The residual signal mainly includes a voice signal component, and may further include an echo component and a noise component that are not completely filtered. In an embodiment, the target signal is then used by a wakeup engine to wake up an intelligent assistant or transmitted to a call receiver over a network. In another embodiment, the target signal may then be further filtered by using a conventional solution such as a non-linear filtering solution or a machine learning solution to obtain better echo filtering effect, and then used by the wakeup engine to wake up the intelligent assistant or transmitted to the call receiver over the network. In addition, the target signal may also be used to update the adaptive filtering so that the echo estimation signal is closer to the echo component in the microphone signal.

Although the operation of the method 700 is shown in the flowchart of FIG. 7, this is merely exemplary and is not intended to limit the scope of the disclosure. The method 700 may have other additional or optional operations. For example, after 710, direct sound filtering as specifically described above may be performed on the residual signal to generate the target signal. In other words, the method 700 may be used in combination with the method 300 to obtain better echo filtering effect. In addition, the method 700 may also be used in combination with the method 500, or in combination with the method 300 and the method 500, as described below with reference to FIG. 14.

Figure 8:
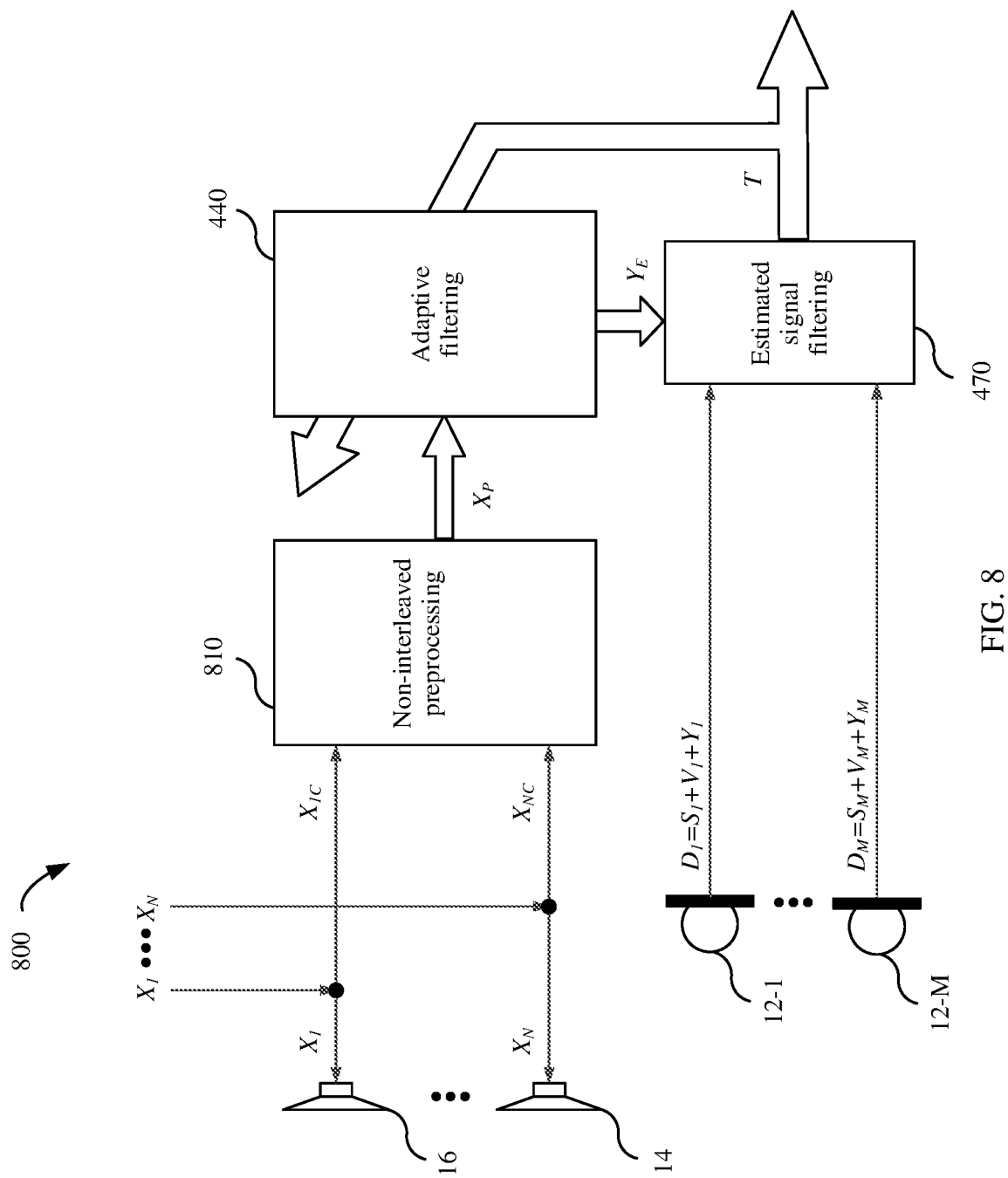
FIG. 8 is a schematic diagram of a non-interleaved preprocessing process according to an embodiment.

FIG. 8 is a schematic diagram of a non-interleaved preprocessing process 800 according to an embodiment. N sound source signals $X_1 \ldots X_N$ from a sound source are respectively output by a processor 110 to N speakers. An audio source is, for example, audio data stored in a storage device in a server that communicates by using the Internet, audio data stored in a local storage device, or audio data captured by a microphone of another device. In addition, N speaker signals $X_{1C} \ldots X_{NC}$ that are copies of the N sound source signals $X_1 \ldots X_N$ are configured by the processor 110 to perform non-interleaved preprocessing as described above, to estimate echo components $Y_1 \ldots Y_M$ in microphone signals $D_1 \ldots D_M$ captured by M microphones. It may be understood that the N sound source signals $X_1 \ldots X_N$ may be the same as the N speaker signals $X_{1C} \ldots X_{NC}$. Alternatively, the N speaker signals $X_{1C} \ldots X_{NC}$ may be different from the N sound source signals $X_1 \ldots X_N$ but can reflect audio content of the N sound source signals $X_1 \ldots X_N$, so that the N speaker signals $X_{1C} \ldots X_{NC}$ may indicate sound played by the speaker. For example, the N sound source signals $X_1 \ldots X_N$ from the sound source may undergo various adjustments and processing, such as gain scaling. The adjusted and processed signals are used as the N speaker signals $X_{1C} \ldots X_{NC}$ for non-interleaved preprocessing, respectively.

The processor 110 performs non-interleaved preprocessing 810 on the obtained N speaker signals $X_{1C} \ldots X_{NC}$ to generate M groups of preprocessed signals XP. The non-interleaved preprocessing 810 may include linear summation, linear difference, reference audio signal sorting, serial/ parallel filtering manner adjustment, gain adjustment, microphone signal-based filtering, and the like. if the at least one preprocessed signal XP includes a plurality of preprocessed signals, serial adaptive filtering or parallel adaptive filtering may be selected based on properties of the preprocessed signal. For example, if the plurality of preprocessed signals are from a speaker signal indicating mono, adaptive processing may be performed on the preprocessed signals in a serial manner. if the plurality of preprocessed signals are from a speaker signal indicating 5.1 surround sound, adaptive processing may be performed on the preprocessed signals in a parallel manner. Therefore, the processor may further judge correlation between the plurality of speaker signals before non-interleaved preprocessing, and perform corresponding non-interleaved preprocessing based on a judgment result. The M groups of preprocessed signals may be generated in different or the same non-interleaved preprocessing manner by using different or the same speaker signals. In other words, the M groups of preprocessed signals may be generated independently of each other, and each group of preprocessed signals may include at least one preprocessed signal. The at least one preprocessed signal is related to a speaker signal selected for the group of preprocessed signals and the non-interleaved preprocessing manner.

The processor 110 then performs adaptive filtering on the M groups of preprocessed signals XP to generate M echo estimation signals $Y_E$. In an embodiment, adaptive filtering may convert the M groups of preprocessed signals XP from time domain signals to frequency domain signals, and perform filtering by using LMS or RLS. For example, for a time domain signal with a sampling rate of 16 kHz, an overlap length of 75% and Fourier transform of 1024 points may be used to convert the time domain signal into a frequency domain signal to achieve a better balance between filtering effect and computation overheads. Certainly, Fourier transform of other overlapping lengths and other points may also be used.

M microphones 12-1 . . . 12-M respectively collect various sound including audio echo, voice, and noise of audio played by a speaker, convert the sound into M microphone signals, and provide the M microphone signals to the processor 110. In an embodiment, a microphone signal $D_1$ captured by the microphone 12-1 includes a voice signal component $S_1$, a noise signal component $V_1$ and an echo signal component $Y_1$. The echo signal component $Y_1$ includes a reflected echo signal component and a direct sound signal component. A microphone signal $D_M$ captured by the microphone 12-M includes a voice signal component $S_M$, a noise signal component $V_M$ and an echo signal component $Y_M$. The echo signal component $Y_M$ includes a reflected echo signal component and a direct sound signal component. Therefore, the microphone signal D is a composite signal of the voice signal component S, the noise signal component V, and the echo signal component Y M microphone signals $D_1$ . . . $D_M$ correspond to the M echo estimation signals $Y_E$. For example, a first echo estimation signal in the M echo estimation signals $Y_E$ corresponds to the first microphone signal $D_1$. An $M^{th}$ echo estimation signal in the M echo estimation signals $Y_E$ corresponds to the $M^{th}$ microphone signal $D_M$.

The processor 110 filters the M echo estimation signals from the M microphone signals respectively to generate M target signals T. For example, the first echo estimation signal is filtered from the first microphone signal $D_1$ to obtain a first target signal. The $M^{th}$ echo estimation signal is filtered from the $M^{th}$ microphone signal $D_M$ to obtain the $M^{th}$ target signal.

The M target signals T may be further used to update adaptive filtering 440 to improve accuracy of echo estimation. For example, the first target signal is used to update adaptive filtering corresponding to the first echo estimation signal. The $M^{th}$ target signal is used to update adaptive filtering corresponding to the $M^{th}$ echo estimation signal.

In an embodiment, the target signal T is then used by a wakeup engine to wake up an intelligent assistant or transmitted to a call receiver over a network. In another embodiment, the target signals T may then be further filtered by using a conventional solution such as a non-linear filtering solution or a machine learning solution to obtain better echo filtering effect, and then used by the wakeup engine to wake up the intelligent assistant or transmitted to the call receiver over the network. In addition, the target signals T may be further used to update adaptive filtering to improve accuracy of echo estimation.

Figure 9:
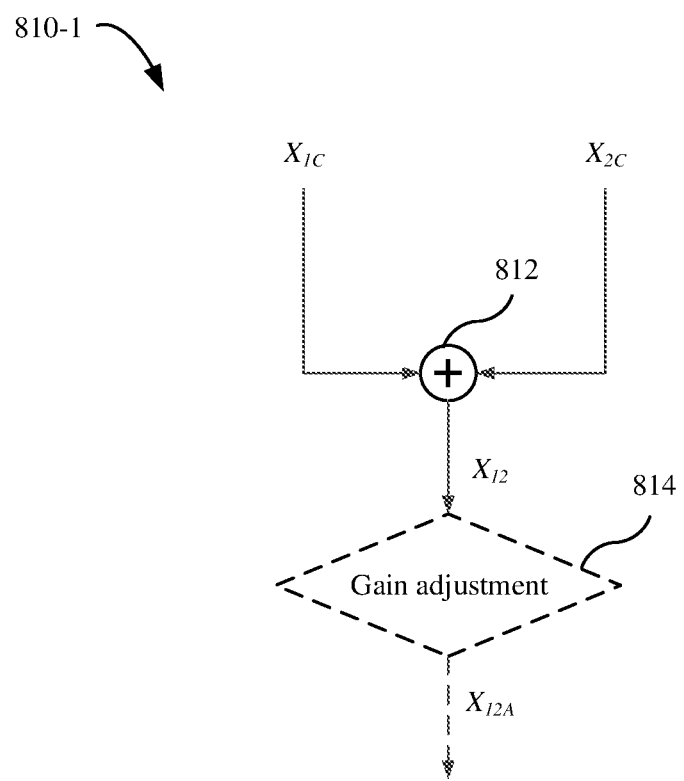
FIG. 9 is a schematic diagram of audio signal processing of an embodiment of non-interleaved preprocessing in FIG. 8.

FIG. 9 is a schematic diagram of summation 810-1 of an embodiment of non-interleaved preprocessing in FIG. 8. The processor 110 performs summation 812 on a first speaker signal $X_{1C}$ and a second speaker signal $X_{2C}$ of the N speaker signals to generate a summation signal $X_{12}$. In an embodiment, the summation signal $X_{12}$ may be used as a preprocessed signal for adaptive filtering. Through linear summation, two audio signals can be synthesized into a single audio signal. In this way, subsequent adaptive filtering of the processor 110 needs to be performed only for a single combined audio signal, thereby reducing a subsequent computation operation overhead.

The summation signal $X_{12}$ may undergo other preprocessing before being adaptively filtered. In another embodiment, the processor 110 may perform adjustment 814 on a gain of the summation signal $X_{12}$ to generate a gain-adjusted preprocessed signal $X_{12A}$. By performing adjustment 814 on the gain, a gain of a final echo estimation signal may match or be equivalent to a gain of the echo component Y in the microphone signal, thereby filtering the echo component more effectively. Alternatively, gains of the first speaker signal $X_{1C}$ and the second speaker signal $X_{2C}$ may be adjusted before the summation 812. In addition, the processor 110 may further average the first speaker signal $X_{1C}$ and the second speaker signal $X_{2C}$ to generate an average signal. It may be understood that averaging is equivalent to halving a gain after summation. Therefore, averaging may be an alternative specific implementation manner of summation.

Although only two speaker signals of the N speaker signals are described herein, it may be understood that the scope of this disclosure is not limited thereto. In some other embodiments, more speaker signals may be used for summation, or a non-interleaved preprocessed signal may be used for summation.

Figure 10:
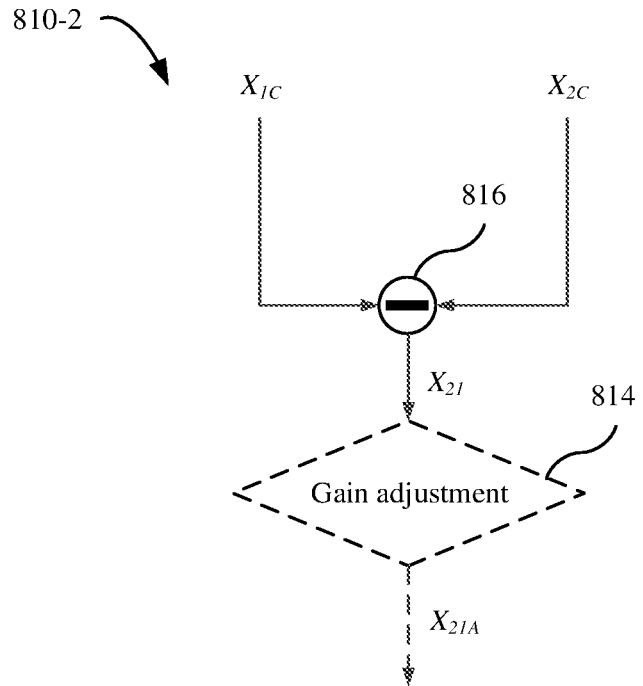
FIG. 10 is a schematic diagram of audio signal processing of another embodiment of non-interleaved preprocessing in FIG. 8.

FIG. 10 is a schematic diagram of difference 810-2 of another embodiment of non-interleaved preprocessing in FIG. 8. The processor 110 performs differential 816 on the first speaker signal $X_{1C}$ and the second speaker signal $X_{2C}$ of the N speaker signals to generate a differential signal $X_{21}$. In an embodiment, the difference signal $X_{21}$ may be used as a preprocessed signal for adaptive filtering. By synthesizing the first speaker signal $X_{1C}$ and the second speaker signal $X_{2C}$ into the single difference signal $X_{21}$, subsequent filtering of the processor 110 needs to be performed only for the difference signal $X_{21}$, thereby reducing a subsequent computational operation overhead. In addition, in some cases, echo filtering focuses on the difference between output of a frequency band or different speakers. In this case, a difference signal $X_{21}$ may be separately provided to the processor 110 or combined with another speaker signal to further improve an echo filtering effect.

The difference signal $X_{21}$ may undergo other preprocessing before being adaptively filtered. In another embodiment, the processor 110 may perform adjustment 814 on a gain of the difference signal $X_{21}$ to generate a gain-adjusted preprocessed signal $X_{21A}$. By performing adjustment on the gain, a gain of a final echo estimation signal may match or be equivalent to a gain of the microphone signal, thereby filtering the echo component more effectively. Alternatively, gains of the first speaker signal $X_{1C}$ and the second speaker signal $X_{2C}$ may be adjusted before the difference 816. Although only two speaker signals of the N speaker signals are described herein, it may be understood that the scope of this disclosure is not limited thereto. In some other embodiments, more speaker signals may be used for difference. For example, difference is performed between the first speaker signal and the second speaker signal, and the difference is performed between a third speaker signal and a fourth speaker signal. In another embodiment, difference may also be performed between the third speaker signal and the difference signal $X_{21}$ by using the third speaker signal.

Figure 11:
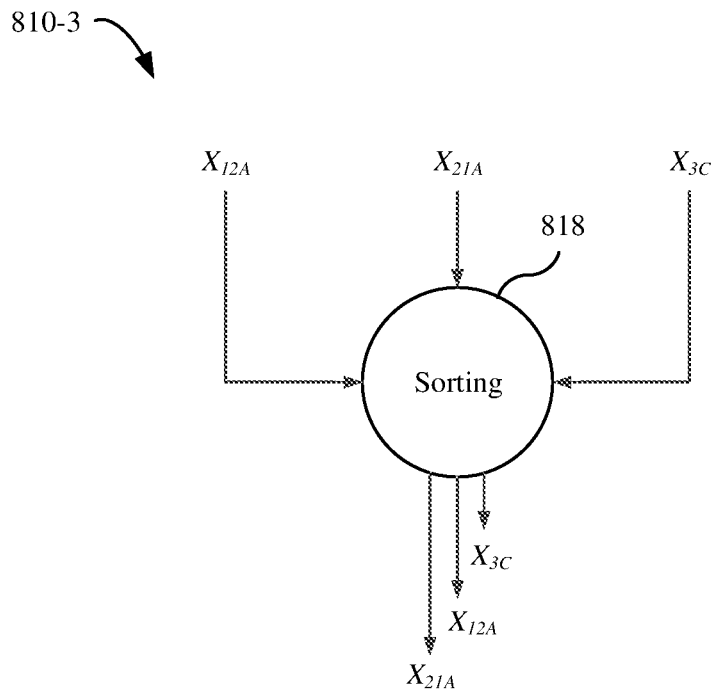
FIG. 11 is a schematic diagram of audio signal processing of still another embodiment of non-interleaved preprocessing in FIG. 8.

FIG. 11 is a schematic diagram of sorting processing 810-3 of still another embodiment of non-interleaved preprocessing in FIG. 8. In an embodiment, the processor 110 performs sorting processing 818 on the gain-adjusted summation signal $X_{12A}$ in FIG. 9, the gain-adjusted difference signal $X_{21A}$ in FIG. 10, and the third speaker signal $X_{3C}$ in the N speaker signals. The processor 110 sorts the difference signal $X_{21A}$ as a first preprocessed signal, sorts the summation signal $X_{12A}$ as a second preprocessed signal, and sorts the third speaker signal $X_{3C}$ as a third preprocessed signal. Adaptive filtering is sequentially performed on the first preprocessed signal, the second preprocessed signal, and the third preprocessed signal.

In some cases, it is beneficial to sort different speaker signals and/or preprocessed signals and perform echo filtering according to a sorting result. For example, a signal of distortion includes a signal with a higher low frequency content may be generated. In a case that the difference signal $X_{21A}$ indicates low-frequency audio, a low-frequency audio component is filtered first to improve an echo filtering effect significantly. The filtering effect can be significantly improved by sorting signals that may produce large distortions as prioritized signals for subsequent adaptive filtering. It may be understood that the sorting shown in FIG. 11 is merely an example, and there may be another combination and sorting of speaker signals and preprocessed signals. The N speaker signals may be sorted directly, for example, based on low frequency content in each speaker signal, and the sorted speaker signals are serially used for adaptive filtering.

Figure 12:
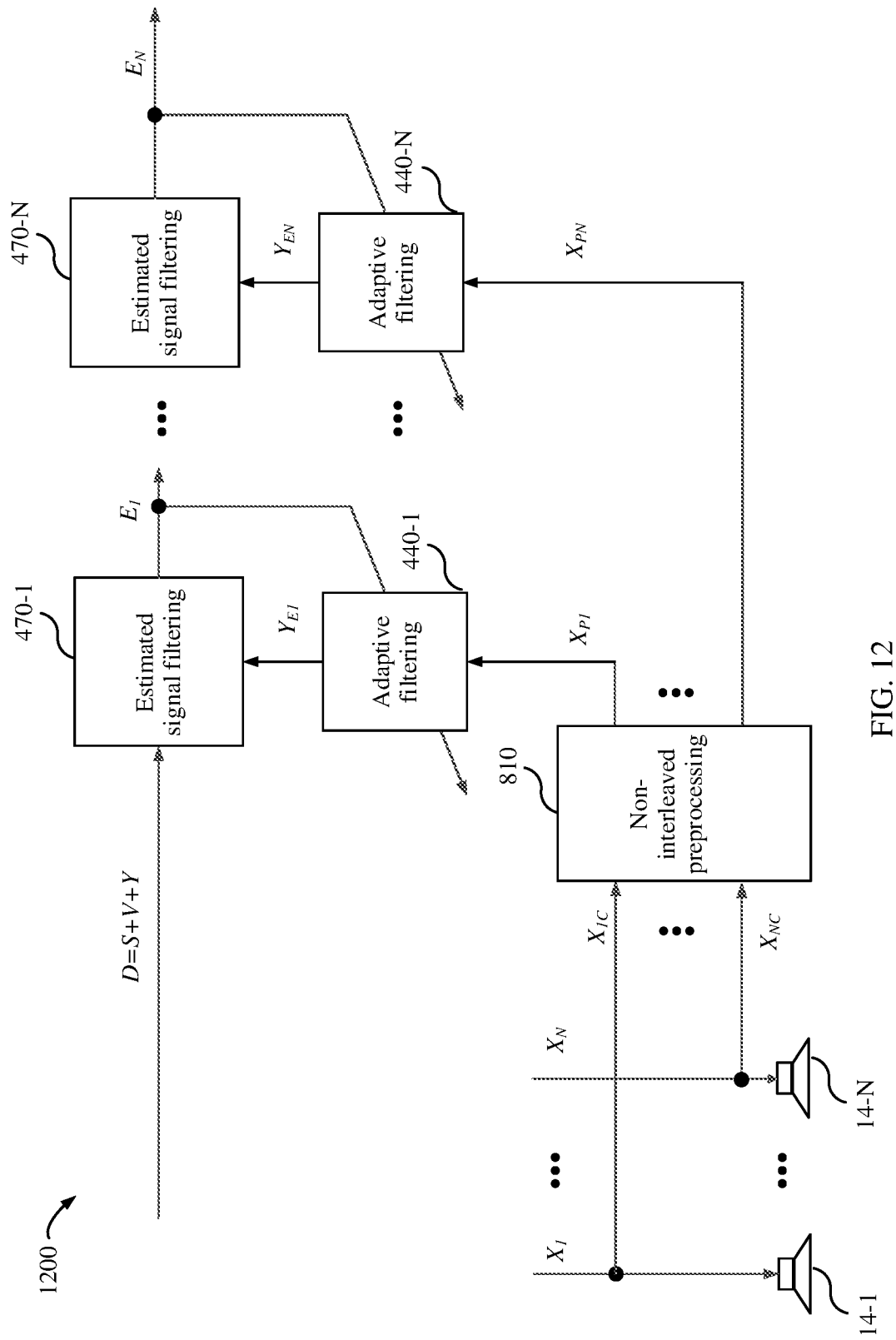
FIG. 12 is a schematic diagram of a serial processing process of an audio signal for echo filtering according to an embodiment of the present disclosure.

FIG. 12 is a schematic diagram of a serial filtering process 1200 of echo filtering according to still another embodiment of the disclosure. The processor 110 performs the non-interleaved preprocessing 810 on N speaker signals $X_{1C} \ldots X_{NC}$ that are copies of the N sound source signals $X_1 \ldots X_N$ to generate N preprocessed signals $X_{P1} \ldots X_{PN}$. The processor 110 then first performs adaptive processing 440-1 on a first preprocessed signal $X_{P1}$ in the N preprocessed signals $X_{P1} \ldots X_{PN}$ to generate a first echo estimation signal $Y_{E1}$. The processor 110 then performs filtering 470-1 on the first echo estimation signal $Y_{E1}$ from the microphone signal D (for example, the first microphone signal) to generate a first residual signal $E_1$.

The processor 110 performs adaptive processing on a second preprocessed signal in the N preprocessed signals $X_{P1} \ldots X_{PN}$ to generate a second echo estimation signal. The processor 110 then performs filtering on the second echo estimation signal from the first residual signal $E_1$ to generate a second residual signal. By analogy, until an $N^{th}$ residual signal $E_N$ as a final residual signal is generated. In an embodiment, the residual signal $E_N$ is then used as the target signal T by a wakeup engine to wake up an intelligent assistant or transmitted to a call receiver over a network. In another embodiment, the residual signal $E_N$ is subsequently used as the target signal T, which may be further filtered by using a conventional solution such as a non-linear filtering solution or a machine learning solution to obtain better echo filtering effect, and then used by the wakeup engine to wake up the intelligent assistant or transmitted to the call receiver over the network. N residual signals $E_1 \ldots E_N$ may be used to update corresponding adaptive filtering 440-1 $\ldots$ 440-N, respectively, so that the echo estimation signal is closer to an echo component in the microphone signal.

If similarity between a plurality of speaker signals is high, serial adaptive filtering and estimated signal filtering may obtain a better filtering effect and better protect voice input of the microphone 112. Although a principle of serial filtering is described in FIG. 12 by using a single microphone signal D, this is merely an example and is not intended to limit the scope of this disclosure. For example, the foregoing serial filtering may be separately performed on the M microphone signals, and a corresponding target signal is finally synthesized into a voice signal.

Figure 13:
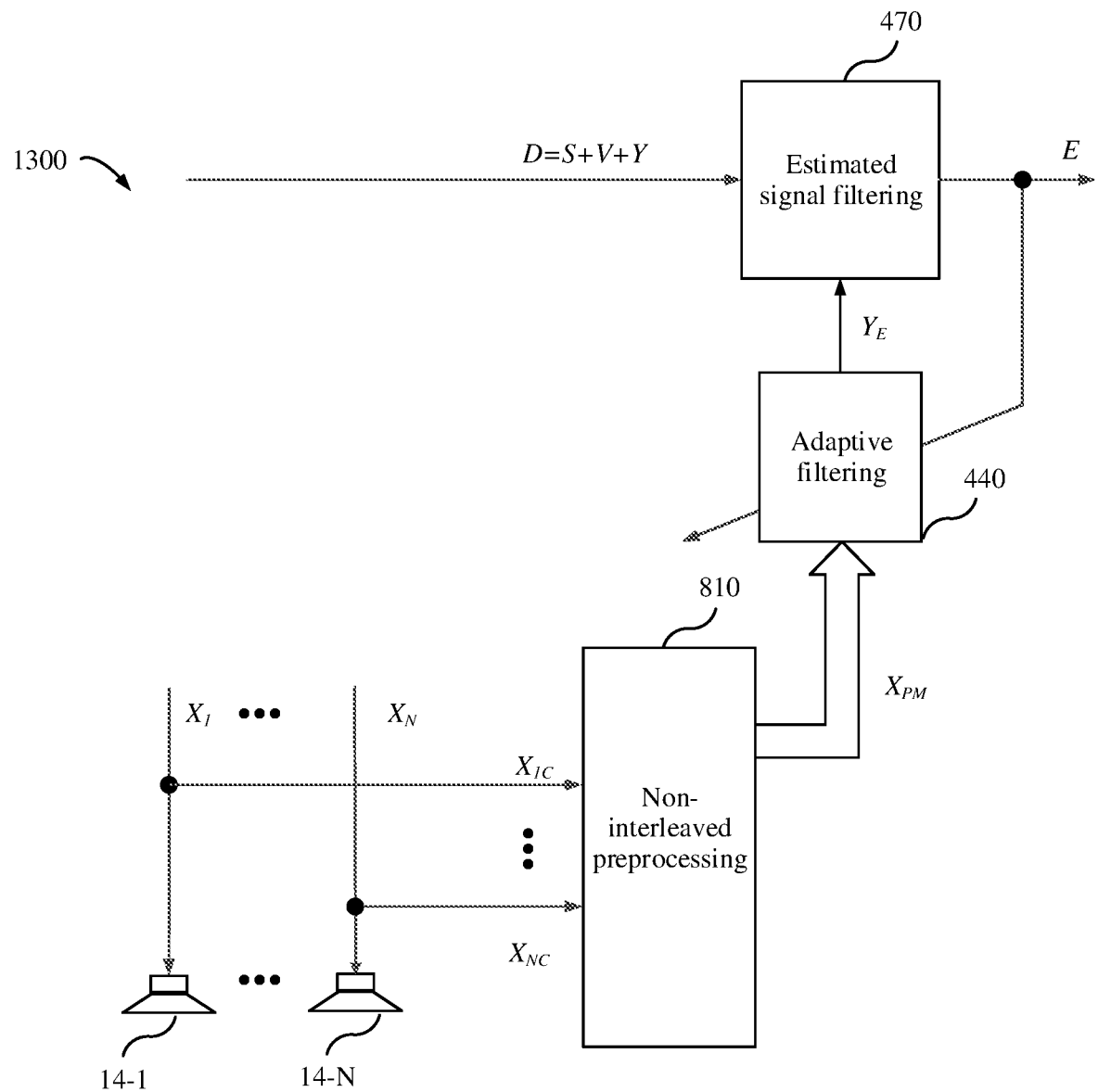
FIG. 13 is a schematic diagram of a parallel processing process of an audio signal for echo filtering according to an embodiment of the present disclosure.

FIG. 13 is a schematic diagram of a parallel filtering process 1300 of echo filtering according to still another embodiment of the disclosure. The processor 110 performs the non-interleaved preprocessing 810 on N speaker signals $X_{1C} \ldots X_{NC}$ that are copies of the N sound source signals $X_1 \ldots X_N$ to generate N preprocessed signals. The N preprocessed signals are combined into a matrix signal $X_{PM}$ for parallel adaptive processing. For example, the N preprocessed signals may be combined into an N-dimensional matrix for parallel adaptive filtering. Whether to perform serial adaptive filtering or parallel adaptive filtering on the plurality of preprocessed signals may be selected based on a similarity between the plurality of speaker signals or preprocessed signals. In an embodiment, the similarity between the plurality of speaker signals is high, for example, the electronic device 100 plays mono audio. In other words, the N speakers 14-1 $\ldots$ 14-N play the same audio. In this case, the N speaker signals $X_{1C} \ldots X_{NC}$ associated with the N sound source signals $X_1 \ldots X_N$ may be serially adaptive filtered to obtain a better filtering effect and better protect speech input of the microphone group 12. In another embodiment, the similarity between the plurality of speaker signals is low, for example, the electronic device 100 plays stereo or 5.1 surround sound audio. In this case, the N preprocessed signals indicating each channel may be combined into a matrix to perform parallel adaptive filtering, to obtain a better filtering effect.

The processor 110 then performs parallel adaptive processing 440 on the matrix signal $X_{PM}$ to generate the echo estimation signal $Y_E$. The processor 110 then filters 470 the echo estimation signal $Y_E$ from the microphone signal D to generate a residual signal E. In an embodiment, the residual signal E is then used as the target signal T by a wakeup engine to wake up an intelligent assistant or transmitted to a call receiver over a network. In another embodiment, the residual signal E is subsequently used as the target signal T, which may be further filtered by using a conventional solution such as a non-linear filtering solution or a machine learning solution to obtain better echo filtering effect, and then used by the wakeup engine to wake up the intelligent assistant or transmitted to the call receiver over the network. The residual signal E may be used to update the adaptive filtering 440 so that the echo estimation signal is closer to the echo component in the microphone signal.

If similarity between the plurality of speaker signals is low, parallel adaptive filtering and estimated signal filtering may obtain a better filtering effect. In an embodiment, the processor 110 may determine the similarity between the N speaker signals before performing non-interleaved preprocessing on the N speaker signals, and select serial filtering or parallel filtering based on a determination result. Although a principle of serial filtering is described in FIG. 13 by using a single microphone signal D, this is merely an example and is not intended to limit the scope of this disclosure. For example, the foregoing parallel filtering may be separately performed on the M microphone signals, and a corresponding target signal is finally synthesized into a voice signal.

Figure 14:
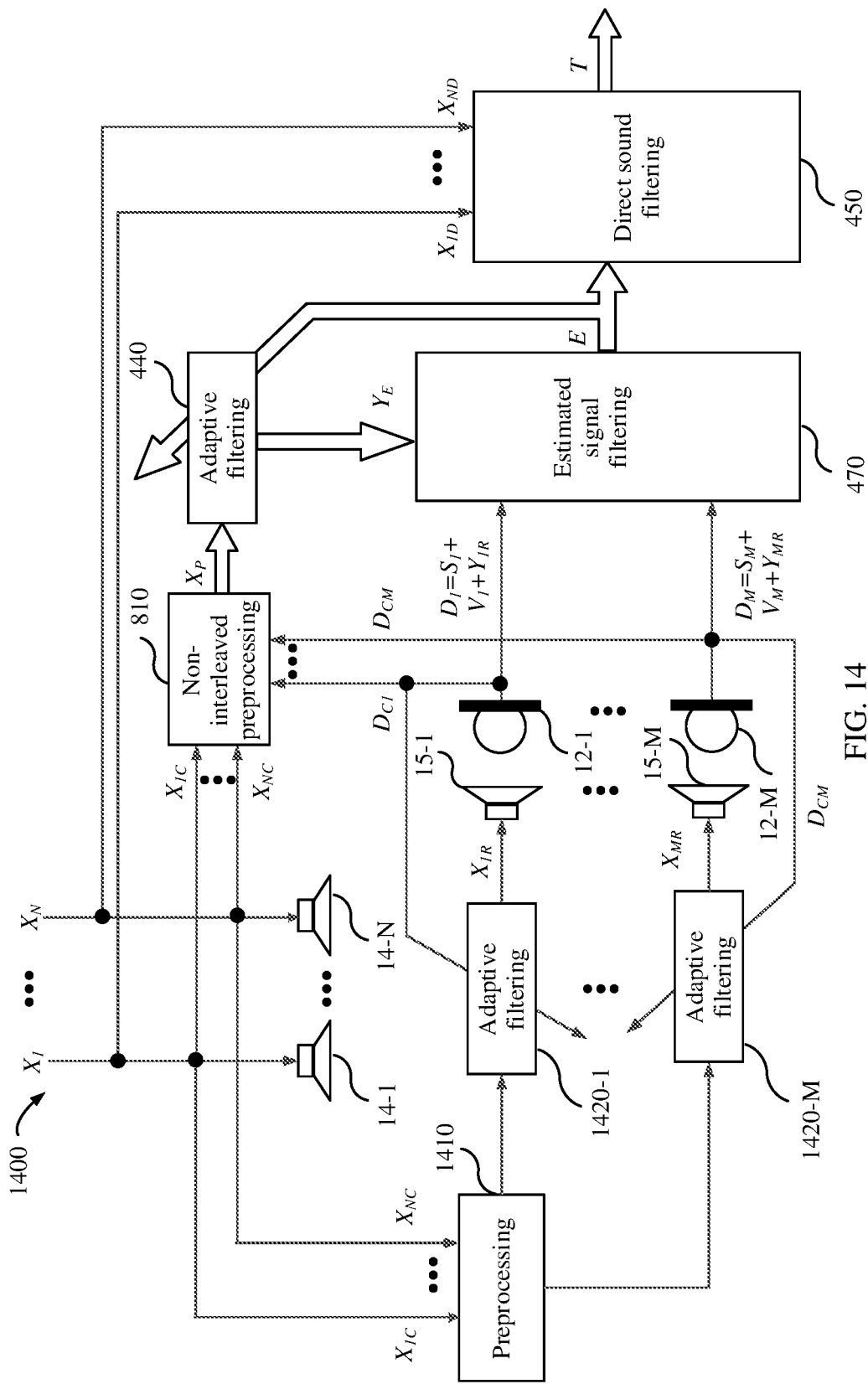
FIG. 14 is a schematic diagram of a processing process of an audio signal for echo filtering according to an embodiment of the present disclosure.

FIG. 14 is a schematic diagram of a processing process 1400 of an audio signal for echo filtering according to an embodiment of the present disclosure. An electronic device 100 has a processor 110, M microphones 12-1 . . . 12-M, M reverse speakers 15-1 . . . 15-M, and N speakers 14-1 . . . 14-N. The M reverse speakers are respectively disposed near the M microphones. M and N are integers greater than 1. N sound source signals $X_1 \ldots X_N$ from a sound source are respectively output by the processor 110 to the N speakers 14-1 . . . 14-N. The processor 110 enables the N speakers 14-1 . . . 14-N to separately play corresponding audio. An audio source is, for example, audio data stored in a storage device in a server that communicates by using the Internet, audio data stored in a local storage device, or audio data captured by a microphone of another device.

The M microphones 12-1 . . . 12-M collect various sound that respectively include audio echo, voice, and noise of audio played by a speaker. In an embodiment, a microphone signal captured by the microphone includes a voice signal component, a noise signal component, and an echo signal component remaining because the reverse audio is not completely canceled. An echo signal component YR includes a reflected echo signal component and a direct sound signal component. For example, a microphone signal $D_1$ captured by the first microphone 12-1 includes a voice signal component $S_1$, a noise signal component $V_1$, and an echo signal component $Y_{1R}$ remaining because the reverse audio is not completely canceled. A microphone signal $D_M$ captured by an $M^{th}$ microphone 12-M includes a voice signal component $S_M$, a noise signal component $V_M$, and an echo signal component $Y_{MR}$ remaining because the reverse audio is not completely canceled. Therefore, the microphone signal is a synthesized signal of the voice signal component, the noise signal component, and the echo signal component.

N speaker signals $X_{1C} \ldots X_{NC}$ that are copies of the N sound source signals $X_1 \ldots X_N$ are preprocessed 1410 in a non-interleaved manner by the processor 110 to generate M groups of preprocessed signals. The M groups of preprocessed signals are then adaptively filtered 1420-1 . . . 1420-M respectively to generate M reverse audio signals. The processor 110 enables reverse speakers 15-1 . . . 15-M to play the reverse audio signal. In an embodiment, adaptive filtering may convert the M groups of preprocessed signals from time domain signals to frequency domain signals, and perform filtering by using LMS or RLS. For example, for a time domain signal with a sampling rate of 16 kHz, an overlap length of 75% and Fourier transform of 1024 points may be used to convert the time domain signal into a frequency domain signal to achieve a better balance between filtering effect and computation overheads. Certainly, Fourier transform of other overlapping lengths and other points may also be used. In addition, copies $D_{C1} \ldots D_{CM}$ of the microphone signal D captured by the microphones 12-1 . . . 12-M may be used to guide an update of the adaptive filtering 1420-1 . . . 1420-M.

The reverse audio cancels, outside the M microphones 12-1 . . . 12-M, echo of audio played by the N speakers 14-1 . . . 14-N, so that microphone signals captured by the M microphones 12-1 . . . 12-M include a voice signal, noise, and remaining echo signal components that are not completely filtered. For example, the microphone signal $D_1$ includes a voice signal $S_1$, noise $V_1$, and a remaining echo signal component $Y_{1R}$ that is not completely filtered. The microphone signal $D_M$ includes a voice signal $S_M$, noise $V_M$, and a remaining echo signal component $Y_{MR}$ that is not completely filtered.

On the other hand, the N speaker signals $X_{1C} \ldots X_{NC}$ are configured by the processor 110 to perform the non-interleaved preprocessing 810 described above, to estimate echo components in the microphone signals captured by the M microphones 12-1 . . . 12-M. Although the N sound source signals $X_1 \ldots X_N$ from the sound source are shown as being directly provided to the N speakers 14-1 . . . 14-N, and the N speaker signals $X_{1C} \ldots X_{NC}$ are directly used for non-interleaved preprocessing, this is merely an example and is not intended to limit the scope of the disclosure. It may be understood that the N sound source signals $X_1 \ldots X_N$ and the N speaker signals $X_{1C} \ldots X_{NC}$ from the sound source may undergo various adjustments and processing, such as gain scaling. The adjusted and processed signals are provided to the N speakers 14-1 . . . 14-N for non-interleaved preprocessing. In some other embodiments, sound source signals $X_1 \ldots X_N$ provided to the speaker and the speaker signals $X_{1C} \ldots X_{NC}$ for non-interleaved preprocessing may be different (for example, different gains), but have correlation so that the speaker signal $X_{1C} \ldots X_{NC}$ may indicate sound played by the speaker 14-1 . . . 14-N.

The processor 110 performs non-interleaved preprocessing 810 on the received N speaker signals $X_{1C} \ldots X_{NC}$ to generate M groups of preprocessed signals XP. The non-interleaved preprocessing 810 may include linear summation, linear difference, reference audio signal sorting, serial/parallel filtering manner adjustment, gain adjustment, filtering of copy signals $D_{C1} \ldots D_{CM}$ based on microphone signals $D_1 \ldots D_M$, and the like as described above. if a group of preprocessed signals includes a plurality of preprocessed signals, serial adaptive filtering or parallel adaptive filtering may be selected based on properties of the preprocessed signals. For example, if the plurality of preprocessed signals are from a reference signal indicating mono, adaptive processing may be performed on the preprocessed signals in a serial manner. if the plurality of preprocessed signals are from a reference signal indicating 5.1 surround sound, adaptive processing may be performed on the preprocessed signals in a parallel manner. The M groups of preprocessed signals may be generated in different or the same non-interleaved preprocessing manner by using different or the same speaker signals. In other words, the M groups of preprocessed signals may be generated independently of each other, and each group of preprocessed signals may include at least one preprocessed signal. The at least one preprocessed signal is related to a speaker signal selected for the group of preprocessed signals and the non-interleaved preprocessing manner. The processor 110 then performs adaptive filtering 440 on the M preprocessed signals to generate M echo estimation signals. The processor 110 filters the M echo estimation signals $Y_E$ from the microphone signal to generate M residual signals. For example, the processor 110 filters M echo estimation signals from the M microphone signals to generate M residual signals E. For example, the first echo estimation signal is filtered from the first microphone signal $D_1$ to obtain a first residual signal. The $M^{th}$ echo estimation signal is filtered from the $M^{th}$ microphone signal $D_M$ to obtain an $M^{th}$ residual signal.

In addition, the M residual signals E may be further respectively used to update the adaptive filtering 440 to improve accuracy of echo estimation. For example, the first residual signal is used to update adaptive filtering corresponding to the first echo estimation signal. The $M^{th}$ residual signal is used to update adaptive filtering corresponding to the $M^{th}$ echo estimation signal. On the other hand, copies $D_{C1} \ldots D_{CM}$ of the microphone signals may be used to update the adaptive filtering 1420-1 . . . 1420-M to improve the accuracy of echo estimation.

The processor 110 may then perform direct sound filtering on the M residual signals E using the N speaker signals $X_{1C} \ldots X_{NC}$ based on the default direct sound filtering model or the customized direct sound filtering model described above, to generate the M target signals T. For example, the direct sound filtering 450 is performed on the first residual signal to generate a first target signal. The direct sound filtering 450 is performed on the $M^{th}$ residual signal to generate an $M^{th}$ target signal. In an embodiment, the M target signals T are then used by a wakeup engine to wake up an intelligent assistant or transmitted to a call receiver over a network. In another embodiment, the M target signals T may then be further filtered by using a conventional solution such as a non-linear filtering solution or a machine learning solution to obtain better echo filtering effect, and then used by the wakeup engine to wake up the intelligent assistant or transmitted to the call receiver over the network.

Figure 15:
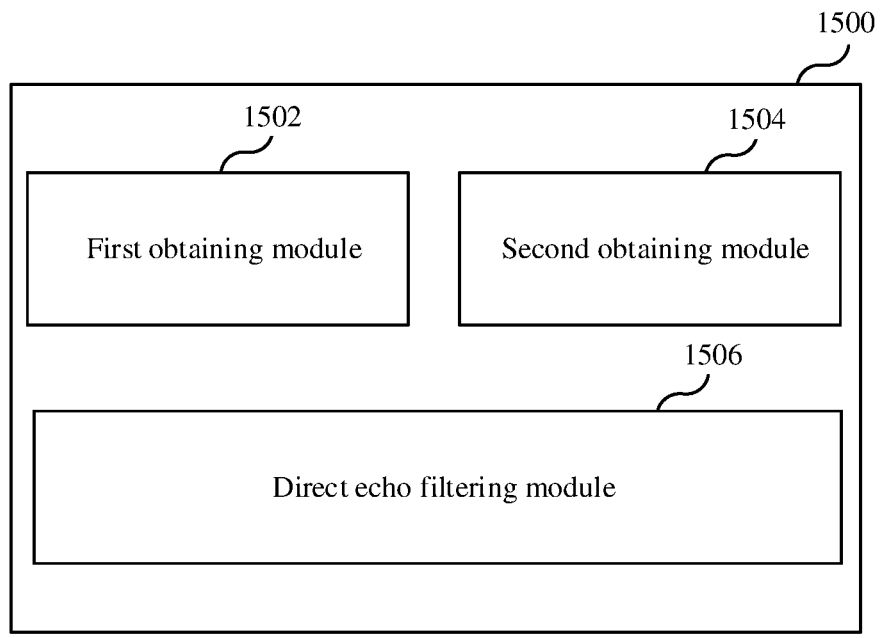
FIG. 15 is a schematic block diagram of an echo filtering apparatus according to an embodiment of the present disclosure.

FIG. 15 is a schematic block diagram of echo filtering apparatus 1500 according to an embodiment of the present disclosure. The apparatus 1500 is used in an electronic device. The electronic device includes M microphones and N speakers. M and N are integers greater than 1. The apparatus 1500 includes a first obtaining module 1502, configured to obtain N speaker signals corresponding to N speakers. The apparatus 1500 further includes a second obtaining module 1504, configured to obtain M microphone signals corresponding to the M microphones. The apparatus 1500 further includes a direct sound filtering module, configured to perform at least direct sound filtering on the N speaker signals and the M microphone signals to obtain a target signal. Direct sound filtering can further improve echo filtering effect.

Although only three modules are shown in FIG. 15, it may be understood that this is merely an example and does not limit the scope of this disclosure. The apparatus 1500 may further include corresponding modules configured to perform the steps in the method 300, the method 500, and/or the method 700, for example, at least one of the modules described in the tenth aspect of this disclosure.

Figure 16:
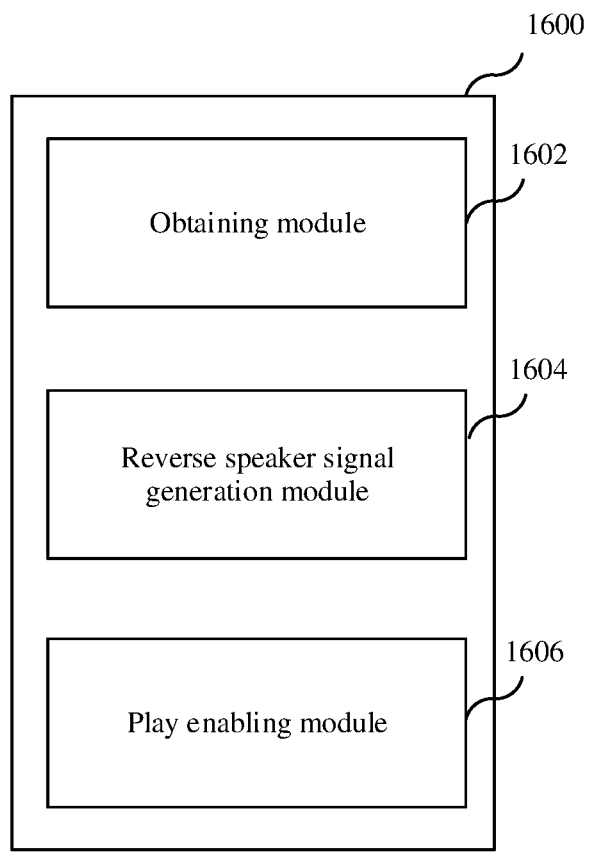
FIG. 16 is a schematic block diagram of an echo filtering apparatus according to another embodiment of the present disclosure.

FIG. 16 is a schematic block diagram of an echo filtering apparatus 1600 according to another embodiment of the present disclosure. The apparatus 1600 is used in an electronic device. The electronic device includes M microphones and N speakers. M and N are integers greater than 1. The apparatus 1600 includes: an obtaining module 1602, configured to obtain N speaker signals corresponding to the N speakers; a reverse speaker signal generation module 1604, configured to generate reverse speaker signals based on the N speaker signals; and a play enabling module 1606, configured to enable a reverse speaker close to at least one of the M microphones to play reverse audio based on the reverse speaker signals, to cancel audio output played by the N speakers corresponding to the N speaker signals. The reverse speaker is different from the N speakers. By enabling the reverse speaker to play the reverse audio, a part of the echo components may be filtered before the echo is captured by the microphone, thereby providing the echo filtering effect.

Although only three modules are shown in FIG. 16, it may be understood that this is merely an example and does not limit the scope of this disclosure. The apparatus 1600 may further include corresponding modules configured to perform the steps in the method 300, the method 500, and/or the method 700, for example, at least one of the modules described in the eleventh aspect of this disclosure.

Although the subject matter has been described in language specific to structural features and/or methodological logical actions, it should be understood that the subject matter defined in the appended claims is not necessarily limited to the specific features or actions described above. On the contrary, the specific features and acts described above are merely examples of implementing the claims.

What is claimed is:

1. An echo filtering method, wherein the method is applied to an electronic device, the electronic device comprises M microphones and N speakers, both M and N are integers greater than 1, and the method comprises:
    obtaining N speaker signals corresponding to the N speakers;
    obtaining M microphone signals corresponding to the M microphones; and
    performing at least direct sound filtering on the N speaker signals and the M microphone signals to obtain a target signal, wherein the direct sound filtering comprises filtering an audio component directly output from the N speakers to the M microphones without environmental reflection,
    wherein the method further comprises:
    enabling a display of the electronic device to display a customized direct sound filtering interface;
    receiving user input of a user in the customized direct sound filtering interface;
    in response to the user input, obtaining N speaker test signals and enabling the N speakers to play the N speaker test signals;
    obtaining M microphone test signals corresponding to the M microphones; and
    storing a customized direct sound filtering model, wherein the customized direct sound filtering model is obtained based on the N speaker test signals and the M microphone test signals, wherein the customized direct sound filtering model is used for the direct sound filtering.

2. The method according to claim 1, wherein the target signal is provided to a wakeup engine to wake up an intelligent voice assistant or is transmitted to another electronic device for a voice call.

3. The method according to claim 1, wherein the target signal comprises fewer echo components than the M microphone signals, and the echo components are used to represent echo of sound propagated in space that is of the N speaker signals and that is captured by the M microphones.

4. The method according to claim 1, wherein the customized direct sound filtering interface displays an indicator for indicating to keep an environment quiet.

5. The method according to claim 1, wherein the direct sound filtering further comprises default direct sound filtering, the default direct sound filtering comprises filtering based at least on a model relationship between N speaker signals played by the N speakers and M microphone signals directly captured by the M microphones in a fully muted environment.

6. The method according to claim 1, further comprising:
generating reverse speaker signals based on the N speaker signals; and
enabling a reverse speaker close to the M microphones to play reverse audio based on the reverse speaker signals to cancel echo of audio output played by the N speakers corresponding to the N speaker signals, wherein the reverse speaker is different from the N speakers.

7. The method according to claim 1, further comprising:
generating an echo estimation signal based on the N speaker signals;
filtering the echo estimation signal from M microphone signals to generate a residual signal; and
obtaining the target signal,
wherein the obtaining the target signal comprises performing the direct sound filtering on the residual signal to obtain the target signal.

8. The method according to claim 7, wherein the generating an echo estimation signal comprises:
performing non-interleaved preprocessing on the N speaker signals to generate at least one preprocessed signal; and
performing adaptive filtering on the at least one preprocessed signal to generate the echo estimation signal.

9. An echo filtering method, wherein the method is applied to an electronic device, the electronic device comprises M microphones, N speakers, and at least one reverse speaker, both M and N are integers greater than 1, and the method comprises:
obtaining N speaker signals corresponding to the N speakers;
generating reverse speaker signals based on the N speaker signals; and
enabling at least one reverse speaker close to at least one of the M microphones to play reverse audio based on the reverse speaker signals to cancel echo of audio output played by the N speakers corresponding to the N speaker signals, wherein the at least one reverse speaker is different from the N speakers.

10. The method according to claim 9, further comprising:
obtaining M microphone signals corresponding to the M microphones; and
performing at least direct sound filtering on the N speaker signals and the M microphone signals to obtain a target signal, wherein the direct sound filtering comprises filtering an audio component directly output from the N speakers to the M microphones without environmental reflection.

11. The method according to claim 10, wherein the target signal is provided to a wakeup engine to wake up an intelligent voice assistant or is transmitted to another electronic device for a voice call.

12. The method according to claim 10, wherein the target signal comprises fewer echo components than the M microphone signals, and the echo components are used to represent echo of audio output propagated in space that is of the N speaker signals and that is captured by the M microphones.

13. The method according to claim 10, further comprising:
enabling a display of the electronic device to display a customized direct sound filtering interface;
receiving user input of a user in the customized direct sound filtering interface;
in response to the user input, obtaining N speaker test signals and enabling the N speakers to play the N speaker test signals;
obtaining M microphone test signals corresponding to the M microphones; and
storing a customized direct sound filtering model, wherein the customized direct sound filtering model is obtained based on the N speaker test signals and the M microphone test signals, wherein the customized direct sound filtering model is used for the direct sound filtering.

14. The method according to claim 13, wherein the customized direct sound filtering interface displays an indicator for indicating to keep an environment quiet.

15. The method according to claim 10, wherein the direct sound filtering comprises default direct sound filtering, the default direct sound filtering indicates filtering based at least on a model relationship between N speaker signals played by the N speakers and M microphone signals directly captured by the M microphones in a fully muted environment.

16. The method according to claim 10, further comprising:
generating an echo estimation signal based on the N speaker signals;
filtering the echo estimation signal from M microphone signals to generate a residual signal; and
obtaining the target signal, wherein the obtaining the target signal comprises: performing the direct sound filtering on the residual signal to obtain the target signal.

17. The method according to claim 16, wherein the generating an echo estimation signal comprises:
performing non-interleaved preprocessing on the N speaker signals to generate at least one preprocessed signal; and
performing adaptive filtering on the at least one preprocessed signal to generate the echo estimation signal.

18. An electronic device, comprising:
N speakers, wherein N is an integer greater than 1;
M microphones, wherein M is an integer greater than 1;
one or more processors, configured to obtain N speaker signals corresponding to the N speakers and M microphone signals corresponding to the M microphones; and
a memory, storing one or more programs, wherein the one or more programs are configured to be executed by the one or more processors, and the one or more programs comprise instructions used to perform operations comprising:
obtaining N speaker signals corresponding to the N speakers;
obtaining M microphone signals corresponding to the M microphones; and
performing at least direct sound filtering on the N speaker signals and the M microphone signals to obtain a target signal, wherein the direct sound filtering comprises filtering an audio component directly output from the N speakers to the M microphones without environmental reflections,
wherein the method further comprises:
enabling a display of the electronic device to display a customized direct sound filtering interface;
receiving user input of a user in the customized direct sound filtering interface;

in response to the user input, obtaining N speaker test signals and enabling the N speakers to play the N speaker test signals;

obtaining M microphone test signals corresponding to the M microphones; and storing a customized direct sound filtering model, wherein the customized direct sound filtering model is obtained based on the N speaker test signals and the M microphone test signals, wherein the customized direct sound filtering model is used for the direct sound filtering.

19. An electronic device, comprising:

N speakers, wherein N is an integer greater than 1;

M microphones, wherein M is an integer greater than 1;

at least one reverse speaker;

one or more processors, configured to obtain N speaker signals corresponding to the N speakers and M microphone signals corresponding to the M microphones, and enable the at least one reverse speaker to play reverse audio; and a memory, storing one or more programs, wherein the one or more programs are configured to be executed by the one or more processors, and the one or more programs comprise instructions used to perform the method comprising:

obtaining N speaker signals corresponding to the N speakers;

generating reverse speaker signals based on the N speaker signals; and enabling at least one reverse speaker close to at least one of the M microphones to play reverse audio based on the reverse speaker signals to cancel echo of audio output played by the N speakers corresponding to the N speaker signals, wherein the at least one reverse speaker is different from the N speakers.

\* \* \* \* \*